US009133736B2

(12) United States Patent
Kakuda et al.

(10) Patent No.: US 9,133,736 B2
(45) Date of Patent: Sep. 15, 2015

(54) VALVE TIMING ADJUSTING SYSTEM

(75) Inventors: Yuji Kakuda, Toyota (JP); Satoshi Kokubo, Nagoya (JP); Kenji Ikeda, Nagoya (JP); Masaki Kobayashi, Okazaki (JP); Yuuki Ohta, Okazaki (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 0 days.

(21) Appl. No.: 14/131,185

(22) PCT Filed: Jul. 5, 2012

(86) PCT No.: PCT/JP2012/067176
§ 371 (c)(1),
(2), (4) Date: Jan. 6, 2014

(87) PCT Pub. No.: WO2013/008711
PCT Pub. Date: Jan. 17, 2013

(65) Prior Publication Data
US 2014/0150744 A1  Jun. 5, 2014

(30) Foreign Application Priority Data
Jul. 12, 2011  (JP) ................. 2011-154142

(51) Int. Cl.
F01L 1/34       (2006.01)
F01L 1/344      (2006.01)
F02D 13/02      (2006.01)

(52) U.S. Cl.
CPC ........... *F01L 1/3442* (2013.01); *F02D 13/0219* (2013.01); *F01L 2001/3443* (2013.01);
(Continued)

(58) Field of Classification Search
CPC ............... F01L 1/3442; F01L 2001/34463; F01L 2001/34469; F01L 2001/34476; F01L 2800/11; F01L 2250/02; F01L 2800/00; F01L 2001/3443; F01L 2001/34483; Y02T 10/18; F02D 13/0219
USPC ...................................... 123/90.17
See application file for complete search history.

(56) References Cited

U.S. PATENT DOCUMENTS 5,823,152 A   10/1998 Ushida
5,836,277 A   11/1998 Kira et al.
(Continued)

FOREIGN PATENT DOCUMENTS

GB    2352775 A    2/2001
JP    11-236831 A  8/1995
(Continued)

OTHER PUBLICATIONS

Notification of Transmittal of the International Preliminary Report on Patentability (Form PCT/IB/338) and the Written Opinion of the International Searching Authority (Form PCT/ISA/237) issued on Jan. 14, 2014, by the International Bureau of WIPO in corresponding International Application No. PCT/JP2012/067176. (6 pages).
(Continued)

*Primary Examiner* — Zelalem Eshete
(74) *Attorney, Agent, or Firm* — Buchanan Ingersoll & Rooney PC

(57) ABSTRACT

A valve timing adjusting system includes a displacement mechanism unit that displaces a camshaft rotational phase relative to a crankshaft, a locking mechanism unit that locks the rotational phase, and a control unit that controls operations of a hydraulic control valve. The control unit includes a property obtainment unit that obtains property information regarding hydraulic properties, and a lock release process completes locking release by supplying oil pressure to the locking mechanism unit for moving the rotational phase from an intermediate locked phase toward one of a retard/advance position, and then supplying oil pressure to the locking mechanism unit for moving the rotational phase toward the other of the retard/advance position; the rotational phase stands by at a predetermined position of the one of the retard/advance position past the intermediate locked phase during the lock release process, until a standby time has elapsed.

5 Claims, 20 Drawing Sheets

(52) U.S. Cl.
CPC ............... *F01L2001/34463* (2013.01); *F01L 2001/34469* (2013.01); *F01L 2001/34476* (2013.01); *F01L 2001/34483* (2013.01); *F01L 2250/02* (2013.01); *F01L 2800/00* (2013.01); *F01L 2800/11* (2013.01); *Y02T 10/18* (2013.01)

(56) References Cited

U.S. PATENT DOCUMENTS

| | | | |
|---|---|---|---|
| 6,053,139 | A | 4/2000 | Eguchi et al. |
| 6,094,974 | A | 8/2000 | Yamagishi et al. |
| 6,418,896 | B2 | 7/2002 | Ogawa |
| 6,505,586 | B1 * | 1/2003 | Sato et al. ............ 123/90.17 |
| 6,739,298 | B2 | 5/2004 | Kusano et al. |
| 7,497,193 | B2 | 3/2009 | Knecht et al. |
| 8,360,022 | B2 | 1/2013 | Ozawa et al. |
| 2002/0139331 | A1 | 10/2002 | Takahashi et al. |
| 2002/0139332 | A1 | 10/2002 | Takenaka |
| 2005/0257763 | A1 | 11/2005 | Watanabe et al. |
| 2005/0284432 | A1 | 12/2005 | Tsukada |
| 2007/0144475 | A1 | 6/2007 | Suzuki et al. |
| 2010/0050966 | A1 | 3/2010 | Ozawa et al. |
| 2010/0175649 | A1 | 7/2010 | Suzuki et al. |
| 2010/0269772 | A1 * | 10/2010 | Takemura et al. ...... 123/90.17 |
| 2010/0294223 | A1 | 11/2010 | Adachi et al. |
| 2011/0030633 | A1 | 2/2011 | Urushihata |
| 2011/0061619 | A1 | 3/2011 | Urushihata |
| 2011/0085921 | A1 | 4/2011 | Kato et al. |
| 2011/0168114 | A1 | 7/2011 | Kobayashi et al. |
| 2012/0000437 | A1 | 1/2012 | Ozawa et al. |
| 2013/0112161 | A1 | 5/2013 | Fujiwaki et al. |
| 2014/0069363 | A1 | 3/2014 | Yamaguchi et al. |
| 2014/0130755 | A1 | 5/2014 | Aisin |
| 2014/0216377 | A1 | 8/2014 | Aisin |

FOREIGN PATENT DOCUMENTS

| | | |
|---|---|---|
| JP | 11-132015 A | 5/1999 |
| JP | 11-210424 A | 8/1999 |
| JP | 11-311107 A | 11/1999 |
| JP | 2000-002104 A | 1/2000 |
| JP | 2001-055934 A | 2/2001 |
| JP | 2002-285872 A | 10/2002 |
| JP | 2002-357105 A | 12/2002 |
| JP | 2003-206711 A | 7/2003 |
| JP | 2003-286813 A | 10/2003 |
| JP | 2004-239209 A | 8/2004 |
| JP | 2005-330892 A | 12/2005 |
| JP | 2006-220154 A | 8/2006 |
| JP | 3918971 B2 | 5/2007 |
| JP | 2007-198365 A | 8/2007 |
| JP | 2008-180132 A | 8/2008 |
| JP | 2009-047128 A | 3/2009 |
| JP | 2009-074384 A | 4/2009 |
| JP | 2009-203886 A | 9/2009 |
| JP | 2009-243372 A | 10/2009 |
| JP | 2009-299643 | 12/2009 |
| JP | 2010-065605 A | 3/2010 |
| JP | 2010-138732 A | 6/2010 |
| JP | 2010-270740 A | 12/2010 |
| JP | 2010-285986 A | 12/2010 |
| JP | 2011-001859 A | 1/2011 |
| JP | 2011-032950 A | 2/2011 |
| JP | 2011-058444 A | 3/2011 |
| JP | 2011-069245 A | 4/2011 |
| JP | 2011-080430 A | 4/2011 |
| JP | 2011-094533 A | 5/2011 |
| JP | 2011-111893 A | 6/2011 |
| JP | 2001-317381 A | 11/2011 |
| WO | WO 2011/001702 A1 | 1/2011 |
| WO | WO 2012/008354 A1 | 1/2012 |
| WO | 2012157045 A1 | 11/2012 |

OTHER PUBLICATIONS

U.S. Appl. No. 14/131,102, filed Jan. 16, 2014, Kobatashi et al.
U.S. Appl. No. 14/131,189, filed Jan. 16, 2014, Kokubo et al.
Office Action issued on Jan. 6, 2015, by the Japanese Patent Office in corresponding Japanese Patent Application No. 2011-154142, and an English Translation of the Office Action. (5 pages).
International Search Report (PCT/ISA/210) issued on Mar. 9, 2010, by Japanese Patent Office as the International Searching Authority for International Application No. PCT/JP2010/052075.
Written Opinion (PCT/ISA/237) issued on Mar. 9, 2010, by Japanese Patent Office as the International Searching Authority for International Application No. PCT/JP2010/052075.
Notification of Transmittal Copies of Translation of the International Preliminary Report on Patentability (Forms PCT/IB/338 and PCT/IB/373) and the Written Opinion of the International Searching Authority (Form PCT/ISA/237) issued on Feb. 23, 2012, in the corresponding International Application No. PCT/JP2010/052075 (6 pages).
International Search Report (PCT/ISA/210) issued on Aug. 2, 2011, by the Japanese Patent Office as the International Searching Authority for International Application No. PCT/JP2011/065589.
Written Opinion (PCT/ISA/237) issued on Aug. 2, 2011, by the Japanese Patent Office as the International Searching Authority for International Application No. PCT/JP2011/065589.
International Preliminary Report on Patentability (PCT/IB/338) and English Translation of Written Opinion of the International Searching Authority (PCT/ISA/237( in the corresponding International Patent Application No. PCT/JP2011/065589.
International Search Report (PCT/ISA/210) mailed on Sep. 11, 2012, by the Japanese Patent Office as the International Searching Authority for International Application No. PCT/JP2012/065337.
Written Opinion (PCT/ISA/237) mailed on Sep. 11, 2012, by the Japanese Patent Office as the International Searching Authority for International Application No. PCT/JP2012/065337.
International Search Report (PCT/ISA/210) mailed on Aug. 7, 2012, by the Japanese Patent Office as the International Searching Authority for International Application No. PCT/JP2012/067176.
Written Opinion (PCT/ISA/237) mailed on Aug. 7, 2012, by the Japanese Patent Office as the International Searching Authority for International Application No. PCT/JP2012/067176.
International Search Report (PCT/ISA/210) mailed on Aug. 7, 2012, by the Japanese Patent Office as the International Searching Authority for International Application No. PCT/JP2012/067175.
Written Opinion (PCT/ISA/237) mailed on Aug. 7, 2012, by the Japanese Patent Office as the International Searching Authority for International Application No. PCT/JP2012/067175.
Japanese Office Action for Japanese Patent Application No. 2011-154143. English translation of relevant portion of Notice of Reasons for Rejection, dated Nov. 13, 2013.
Japanese Office Action (Reasons) dated Jun. 30, 2014, issued by the Japanese Patent Office in corresponding Japanese Patent Application No. 2012-171061, and English language translation of Office Action. (5 pages).
Extended European Search Report dated Jul. 20, 2015, in corresponding European Application No. 12810655.6.

* cited by examiner

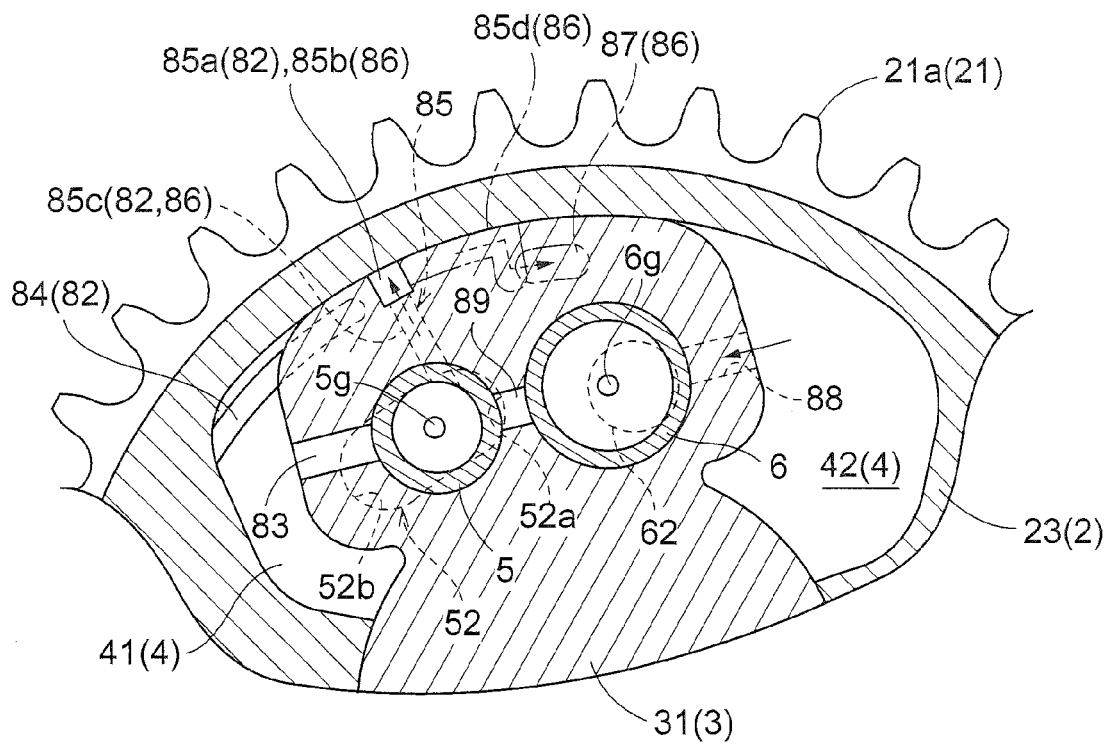
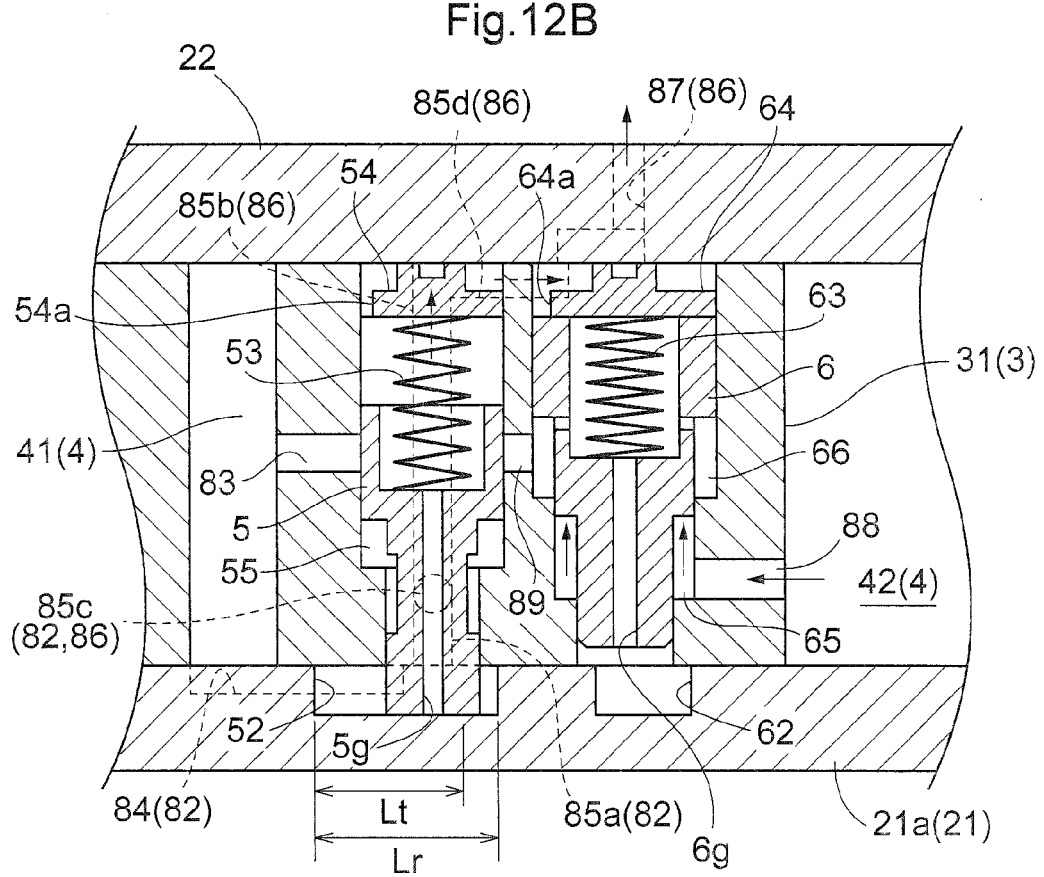

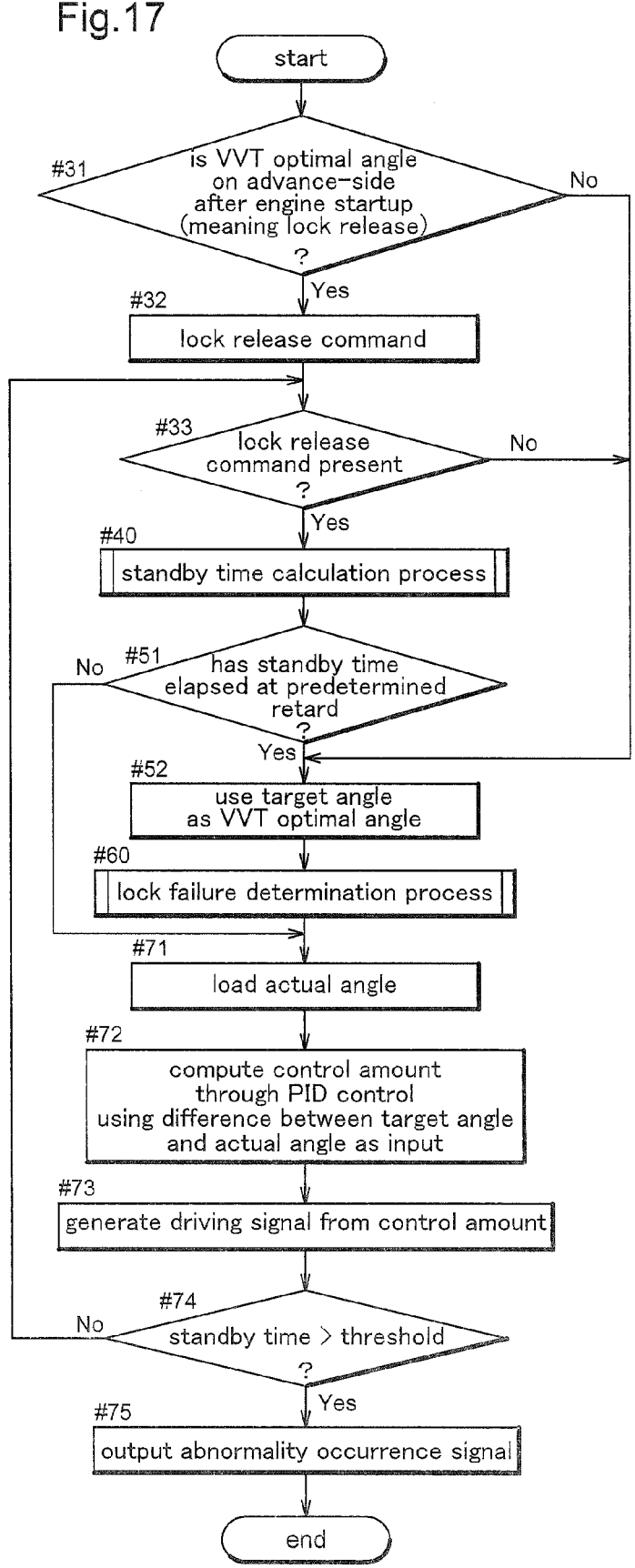

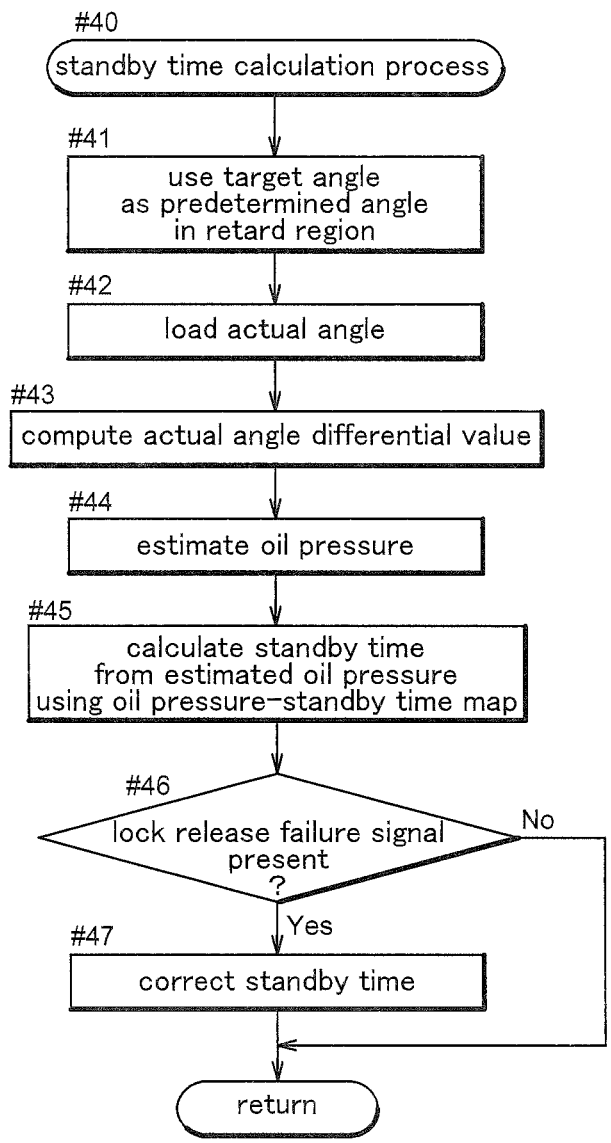

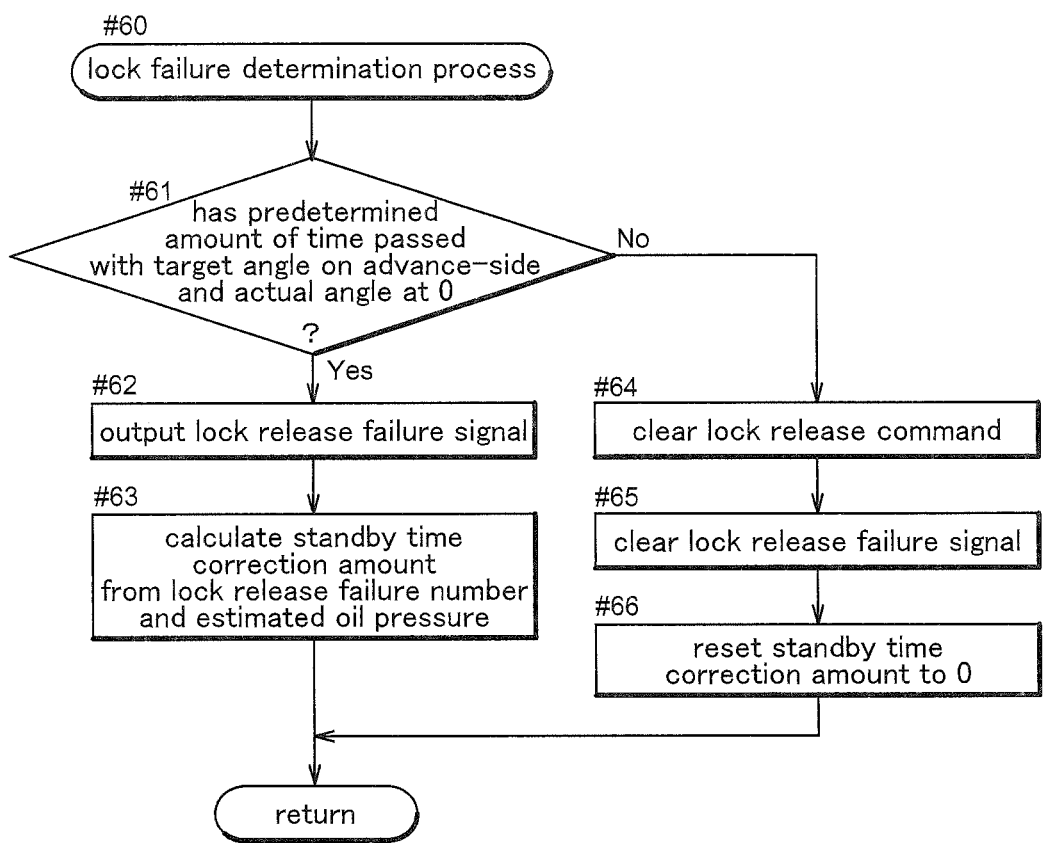

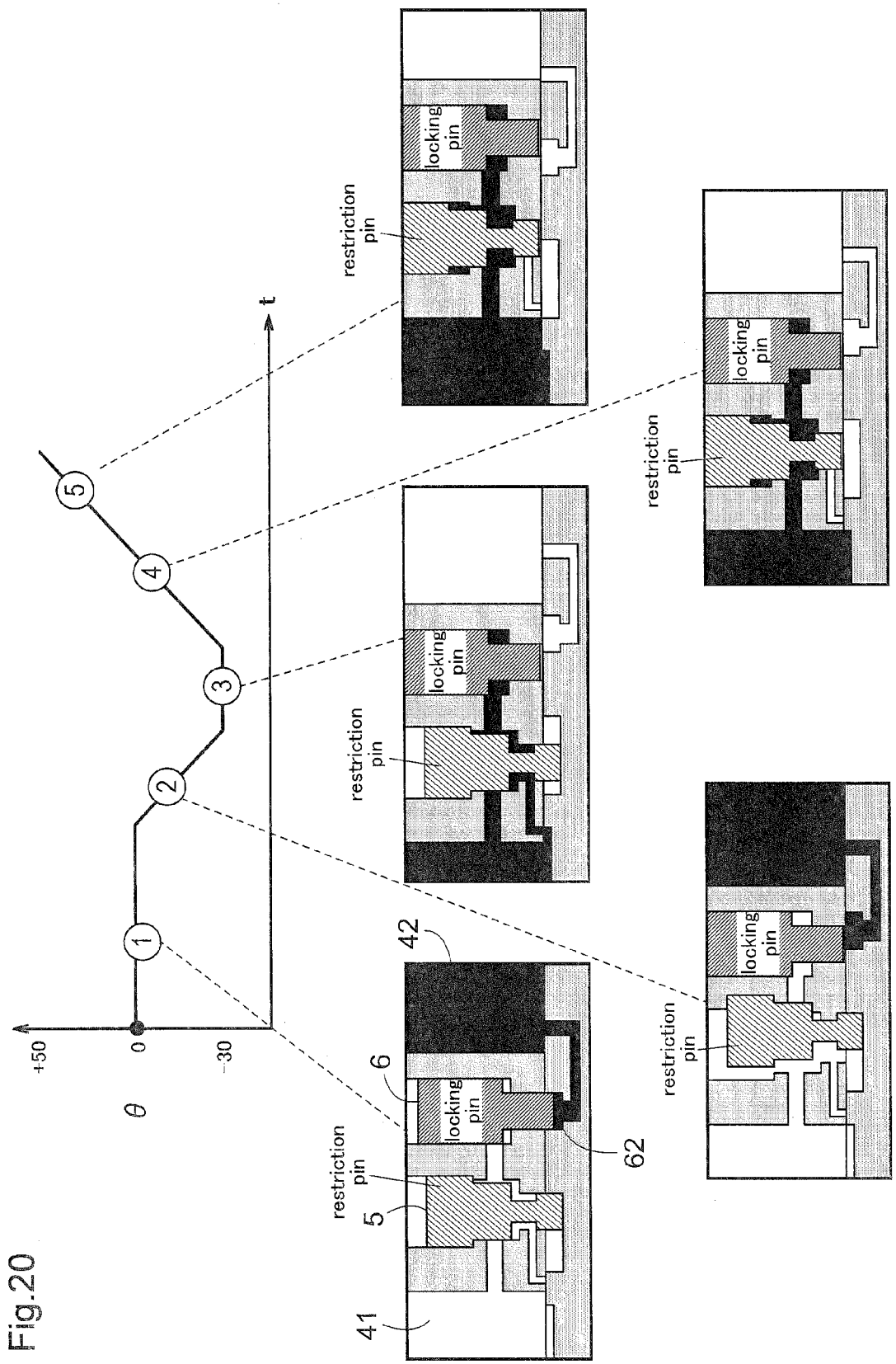

VALVE TIMING ADJUSTING SYSTEM

TECHNICAL FIELD

The present invention relates to valve timing adjusting system that controls a relative rotational phase of a driven-side rotating member relative to a driving-side rotating member that rotates in synchronization with a crankshaft in an internal combustion engine.

BACKGROUND ART

A valve timing control device is known that includes a hydraulic lock mechanism configured of a locking recess formed in a driven-side rotating member and a locking member capable of extending into/retracting from the locking recess, in order to hold a relative rotational phase (called simply a "rotational phase" hereinafter) of the driven-side rotating member relative to a driving-side rotating member in a predetermined intermediate rotational phase (a locked rotational phase or locked position). Note that here, the locking member being inserted into the locking recess will be referred to as locking or a locking operation, whereas the locking member retracting from the locking recess will be referred to as releasing the lock or a lock release operation. In this valve timing control device, when a locking request or a lock release request has occurred, it is necessary to control a hydraulic control valve so that an operation for displacing the relative rotational phase of the driven-side rotating member relative to the driving-side rotating member as well as the locking operation and the lock release operation can be carried out smoothly.

Patent Document 1 discloses a valve timing control device that controls both a displacement of a rotational phase and an operation of a locking pin using a single hydraulic control valve. In this device, a control means that controls a driving signal (driving current) to the hydraulic control valve divides a control region for the control of the hydraulic control valve into a plurality of control regions, and causes a driving current control property in at least one of the control regions to be different from the driving current control properties in the other control regions. Specifically, in control regions where it is necessary to ensure precise and stable phase displacement control, a driving current control response speed (time constant) is set to a range capable of preventing overshoot/hunting, whereas in control regions where a high level of responsiveness is required, the driving current control response speed (time constant) is set to increase responsiveness. For example, the responsiveness is increased in a locking pin control region where the locking pin is driven in a locking direction/lock release direction, whereas in a control region where the rotational phase is displaced to a target rotational phase set in accordance with driving conditions, the responsiveness is decreased to ensure precision and stability.

By setting different response speeds for locking operation/lock release operation control and rotational phase displacement control, this apparatus aims to optimize the performance of the respective operations. However, because the response speed in the locking operation/lock release operation control is changed after it has been determined that locking or a lock release has been requested, there is a problem in that proper valve timing control cannot be carried out if the timing of the determination is too early or too late, and in particular that the locking pin cannot exit the locking recess.

Patent Document 2 discloses a control device for an internal combustion engine provided with a phase variation mechanism that enables a rotational phase of a camshaft relative to a crankshaft to be changed and a variable valve lift mechanism capable of continually changing the lift amount of an induction valve. This device provides separate modes for a low-load driving region and a high-load driving region, and the modes separate closing operations into a fast-closing operation and a slow-closing operation; settings for the timing at which the induction valve is closed and a target cylinder air amount are then changed. When the mode transits, the cylinder air amount is adjusted as appropriate, which not only makes it possible to prevent abnormal combustion with certainty, but also makes it possible to reduce pumping loss and increase the engine driving efficiency. However, although this device separates low-load and high-load driving regions, there is no mention of providing separate modes during operations for variable valve control, and no considerations are made for adjusting control modes in valve timing control.

Patent Document 3 discloses a valve timing control device including a phase conversion mechanism that displaces a relative phase (rotational phase) between a driving-side rotating member that rotates in synchronization with a crankshaft and a driven-side rotating member that rotates integrally with a camshaft by supplying/discharging a working fluid to/from two types of pressure chambers whose volumes vary in a complementary manner via a mobile partition, and a lock mechanism that uses the working fluid to both enable the relative phase to be fixed during an intermediate locked phase suited to internal combustion engine startup and enable the fixed phase to be released. A first control valve that controls the supply of working oil for rotational phase displacement and a second control valve that controls the supply of working oil for locking operations are provided. Optimal relative phases for engine driving states are held and stored in a control unit, and the configuration is such that the optimal relative phase can be obtained for driving states (engine RPM, coolant temperature, and the like) detected separately. Information such as whether an ignition key is on or off, information from an oil temperature sensor that detects an engine oil temperature, and so on are also inputted into the control unit. Although the valve timing control device is configured to calculate the optimal target relative phase (target rotational phase) based on the driving state, no specific mention is made regarding the computation of an operation amount for driving a hydraulic control valve for achieving the calculated target rotational phase. In particular, no consideration is given to controlling the hydraulic control valve so that operations for displacing the rotational phase, locking operations, and lock release operations can be carried out smoothly.

PRIOR ART DOCUMENTS

Patent Document

Patent Document 1: JP 2011-058444A (paragraphs [0002-0011] [0043-0049]; FIG. 9)
Patent Document 2: JP 2009-243372A (paragraphs [0029-0125]; FIGS. 5 and 12)
Patent Document 3: JP 2009-074384A (paragraphs [0012-0040]; FIG. 1)

SUMMARY OF INVENTION

Technical Problem

Having been achieved in light of the aforementioned situation, it is an object of the present invention to improve upon conventional valve timing control so that operational control of a locking mechanism unit, and particularly a lock release operation, can be carried out with certainty.

Solution to Problem

To achieve the aforementioned object, a valve timing adjusting system according to the present invention includes a displacement mechanism unit that displaces a rotational phase of a camshaft relative to a crankshaft of an internal combustion engine between a retard position and an advance position, a locking mechanism unit that locks the rotational phase at an intermediate locked phase positioned within a displacement range of the rotational phase by inserting a locking pin into a locking recess, a hydraulic pathway having a hydraulic control valve that hydraulically drives the displacement mechanism unit and the locking mechanism unit, and a control unit having a control system that controls operations of the hydraulic control valve. Here, the control unit includes a property obtainment unit that obtains property information regarding hydraulic properties of the hydraulic pathway; a lock release process that releases the locking of the locking mechanism unit completes the locking release by supplying oil pressure to the locking mechanism unit for moving the rotational phase from the intermediate locked phase toward one of the retard position and the advance position, and then supplying oil pressure to the locking mechanism unit for moving the rotational phase toward the other of the retard position and the advance position; the rotational phase is caused to stand by at a predetermined position of the one of the retard position and the advance position past the intermediate locked phase during the lock release process, until a standby time has elapsed; and the system further comprises a standby time changing unit that changes the standby time based on the property information.

When the locking pin exits the locking recess and the standby time for causing the rotational phase to stand by in a position on the retard-side or the advance-side of the intermediate locked phase is fixed, a lock release failure may occur due to shift a timing at which the oil pressure is applied to the locking mechanism unit and the displacement mechanism unit under fluctuations in the hydraulic properties. According to the present invention as configured above, the likelihood of a lock release failure caused by a shift in the timing at which the oil pressure is applied due to fluctuations in the hydraulic properties is reduced by properly adjusting the standby time for causing the rotational phase to stand by in a position on the retard-side or the advance-side of the intermediate locked phase based on the hydraulic properties obtained by the property obtainment unit.

For example, in the case where a drop in the force of, or a delay in, the action of the locking pin exiting from the locking recess due to a drop in working oil viscosity, oil pressure, or the like, extending the standby time makes the lock release operation more certain.

The oil temperature and oil pressure in the hydraulic pathway, and the RPM of a hydraulic pump, as well as a degree of oil degradation that can be linked to the viscosity, can be given as examples of the property information that determines the values of the dynamic hydraulic properties, and thus it is preferable to employ a configuration in which the property information includes at least one of the oil temperature and oil pressure in the hydraulic pathway, the RPM of the hydraulic pump, and the degree of oil degradation. However, if additional costs are taken into consideration, it is favorable to use the oil temperature and oil pressure in the hydraulic pathway, the RPM of the hydraulic pump, and the degree of oil degradation already obtained for other purposes. For example, obtaining the oil pressure from an oil pressure sensor attached directly to the hydraulic pathway incurs additional costs, and thus it is preferable to estimate the oil pressure from the hydraulic pump RPM.

It is highly likely that the lock release failure is caused by an insufficient standby time. To rephrase, extending the standby time makes it possible to prevent lock release failures. However, if the standby time is extended more than necessary, the temporal responsiveness of the control system will drop, which is linked to poorly-responsive maneuverability. Accordingly, in the case where the lock release failure has occurred, it is important to gradually extend the standby time and find the minimum standby time at which the lock release failure will not occur. To achieve this, in a preferred embodiment of the present invention, the standby time changing unit includes a correction unit that extends and corrects the standby time in the case where the lock release failure has been detected in the locking mechanism unit.

To reduce a problem of redundancy, where the correction unit repeats the correction and extension of the standby time each time, in a further preferred embodiment, the correction unit is constructed as a learning-based correction unit that calculates a correction amount for the standby time based on a learning result from a plurality of lock release failures. This makes it possible to determine the proper standby time with certainty and quickly.

In the case where the standby time is extended with the occurrence of lock release failures, it is necessary to provide a limit value for the time extension. If that limit value is linked to a threshold value for the occurrence of an abnormality in the locking mechanism unit, it is possible to make a notification of a malfunction in the locking mechanism unit, and a problem in which low-gas mileage travel or travel with poor acceleration continues over a long period can be prevented. Accordingly, in a preferred embodiment of the present invention, an abnormality determination unit that outputs an abnormal signal when the standby time extended by the standby time changing unit exceeds a threshold is provided.

BRIEF DESCRIPTION OF DRAWINGS

FIG. 12A is a plan view illustrating states of the restriction mechanism and the lock mechanism when setting the restricted state.

FIG. 12B is a cross-sectional view illustrating states of the restriction mechanism and the lock mechanism when setting the restricted state.

FIG. 17 is a flowchart illustrating an example of a rotational phase control routine for a VVT mechanism.

FIG. 18 is a flowchart illustrating an example of a standby time calculation processing routine.

FIG. 19 is a flowchart illustrating an example of a lock failure determination processing routine.

FIG. 20 is a schematic diagram illustrating a rotational phase displacement process from startup to lock release.

DESCRIPTION OF EMBODIMENTS

Figure 1:
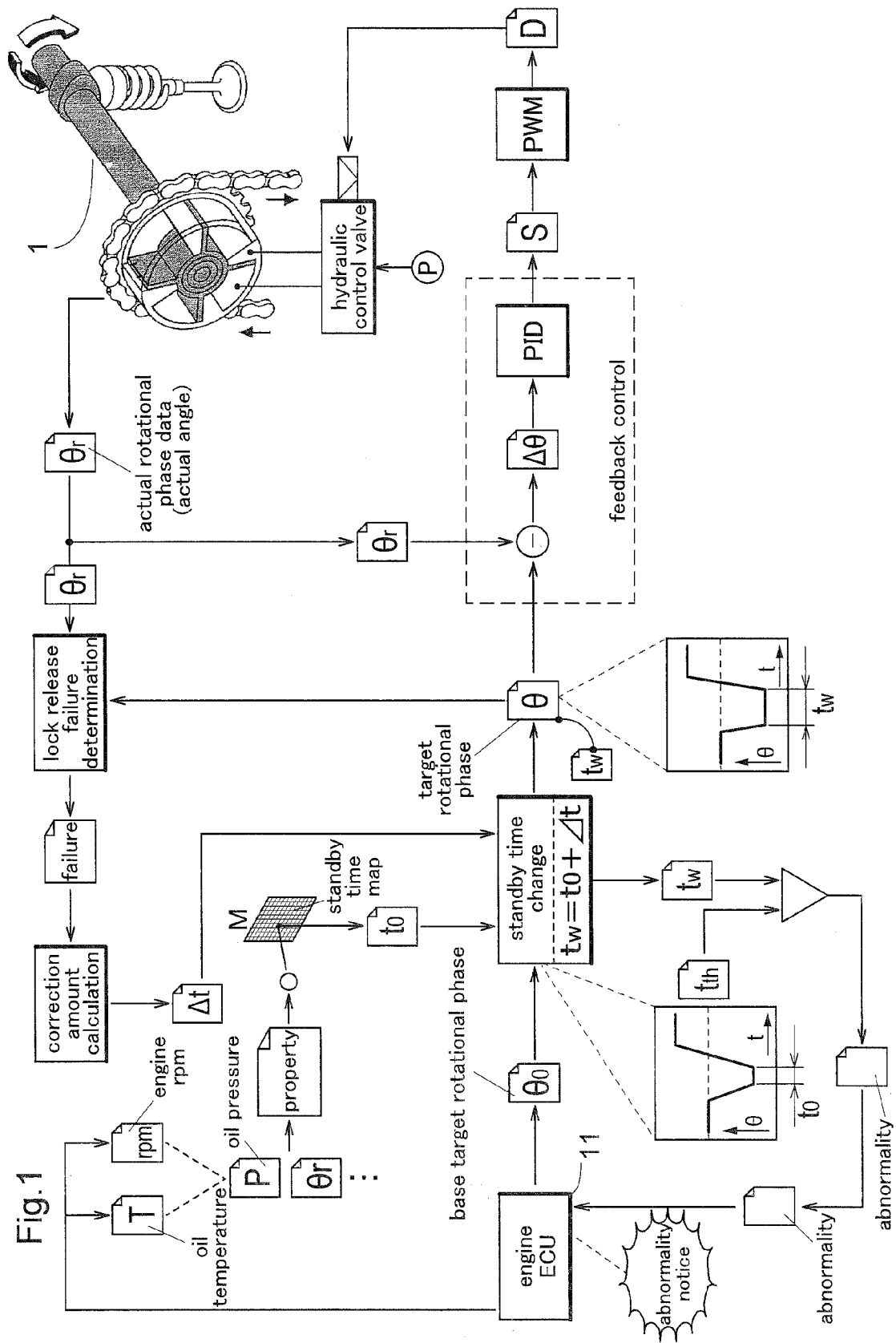
FIG. 1 is a schematic diagram illustrating the overall flow of basic control performed by a valve timing adjusting system according to the present invention.

Before describing a specific embodiment of a valve timing adjusting system according to the present invention, an overall description of the invention will be given using a schematic diagram in FIG. 1. Here, this system includes a valve timing adjustment mechanism (called a VVT mechanism hereinafter) 1 that is hydraulically controlled by a driving signal outputted from an electronic control system including a feedback control unit. Although detailed descriptions will be given later, the VVT mechanism 1 includes a displacement mechanism unit that displaces a rotational phase of a camshaft relative to a crankshaft in an internal combustion engine E (also called an engine E) in an advance direction or a retard direction and a locking mechanism unit that locks the rotational phase at an intermediate locked phase positioned within a displacement range of the rotational phase. The displacement mechanism unit and the locking mechanism unit are operated by a hydraulic control valve (not shown in FIG. 1) whose driving is controlled by a driving signal (for example, a PWM signal).

As an overall flow of control, first, an operation amount is computed and outputted based on a deviation between a target rotational phase obtained by correcting a base target rotational phase that serves as a control target for the rotational phase supplied from an engine ECU 11, and an actual rotational phase (an actual angle of the VVT mechanism 1) that serves as a control amount. Furthermore, a driving signal is generated from the operation amount and is outputted to the hydraulic control valve. Note that in this drawing, the base target rotational phase is indicated by θ0, the target rotational phase is indicated by θ, the deviation is indicated by θ0, the operation amount is indicated by S, the driving signal is indicated by D, and the actual rotational phase is indicated by θr.

An important characteristic of this invention is that a standby time for which the rotational phase is caused to stand by in a retard position is extended in the case where a lock release failure has occurred in the locking mechanism unit during a lock release process for a locking pin. FIG. 1 illustrates the standby time becoming a standby time: tw obtained by extending a basic standby time: t0 at the retard position by a calculated correction amount: Δt, which is then employed in feedback control serving as the main control.

The standby time change is expressed as tw=t0+Δt.

The basic standby time: t0 is calculated based on property information regarding hydraulic properties of a hydraulic pathway including the hydraulic control valve. The oil temperature and oil pressure in the hydraulic pathway, the RPM of a hydraulic pump (which can be substituted with engine RPM), a degree of oil degradation, and so on can be used as the property information. Although the oil pressure has the greatest influence on the standby time, the oil temperature (indicated by T in the drawings) and the engine RPM (indicated by rpm in the drawings) are employed here as parameters that enable the oil pressure to be estimated.

Furthermore, based on the findings of this application's inventors, which indicate that the correction amount can also be calculated for the standby time based on a hydraulic usage state in the lock release process, a change in the actual rotational phase (actual angle) over time, that is, a change rate: λ, is also employed as an element of the property information.

Using such property information as input parameters, the basic standby time can be calculated through the following generally-mapped relational expression: M.

$$t0=M(T,\text{rpm},\lambda)$$

The expression may be t0=M(T,rpm) or t0=M(λ) instead.

When the lock release failure is determined to have occurred, the correction amount: Δt can be provided as a predetermined amount or as an amount calculated in accordance with the severity of the failure. The lock release failure can be determined based on the behavior over time of the actual rotational phase relative to the target rotational phase.

Furthermore, FIG. 1 also illustrates a function for assuming that the locking mechanism unit has malfunctioned when the standby time: tw has exceeded a threshold: tth and outputting an abnormal signal. A driver can be given an abnormality notice, notifying him/her of the malfunction, by supplying this abnormal signal to the engine ECU 11.

Feedback control itself has a well-known configuration, and the operation amount: S is computed based on a deviation (indicated by Δθ in the drawings) between the actual angle (indicated by θr in the drawings) corresponding to a measured value of the rotational phase in the VVT mechanism 1 (an actual value of the rotational phase) and the target angle (indicated by θ in the drawings) corresponding to a target value. Furthermore, the driving signal: D is generated from the computed operation amount and is outputted to the hydraulic control valve.

Figure 2:
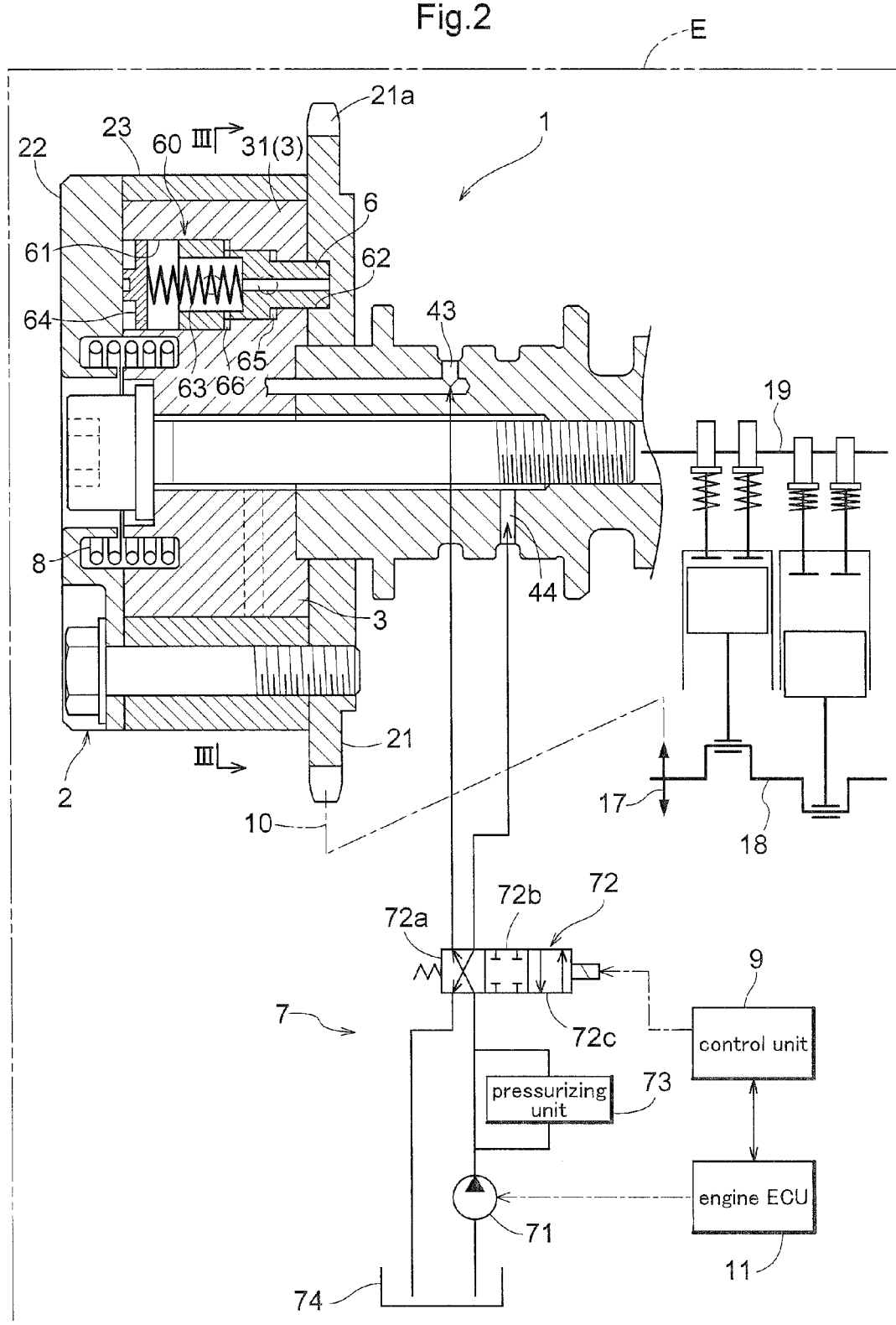
FIG. 2 is a cross-sectional view illustrating the overall configuration of a valve timing control device, seen from the side.

Embodiments of the present invention will be described based on FIG. 2 to FIG. 13B. First, the overall configuration of the VVT mechanism 1 will be described based on FIG. 2 and FIG. 3.

(Overall Configuration)

The valve timing control mechanism (called simply a VVT mechanism hereinafter) 1 includes an outer rotor 2 serving as a driving-side rotating member that rotates in synchronization with a crankshaft 18 of the engine E, and an inner rotor 3 serving as a driven-side rotating member that is disposed coaxially with the outer rotor 2 and that rotates in synchronization with a camshaft 19.

The outer rotor 2 is configured of a rear plate 21 attached on a side to which the camshaft 19 is connected, a front plate 22 attached on the opposite side as the side to which the camshaft 19 is connected, and a housing 23 sandwiched between the rear plate 21 and the front plate 22. The inner rotor 3 housed within the outer rotor 2 is assembled integrally with a leading end portion of the camshaft 19, and is capable of rotating relative to the outer rotor 2 within a set range.

Figure 3:
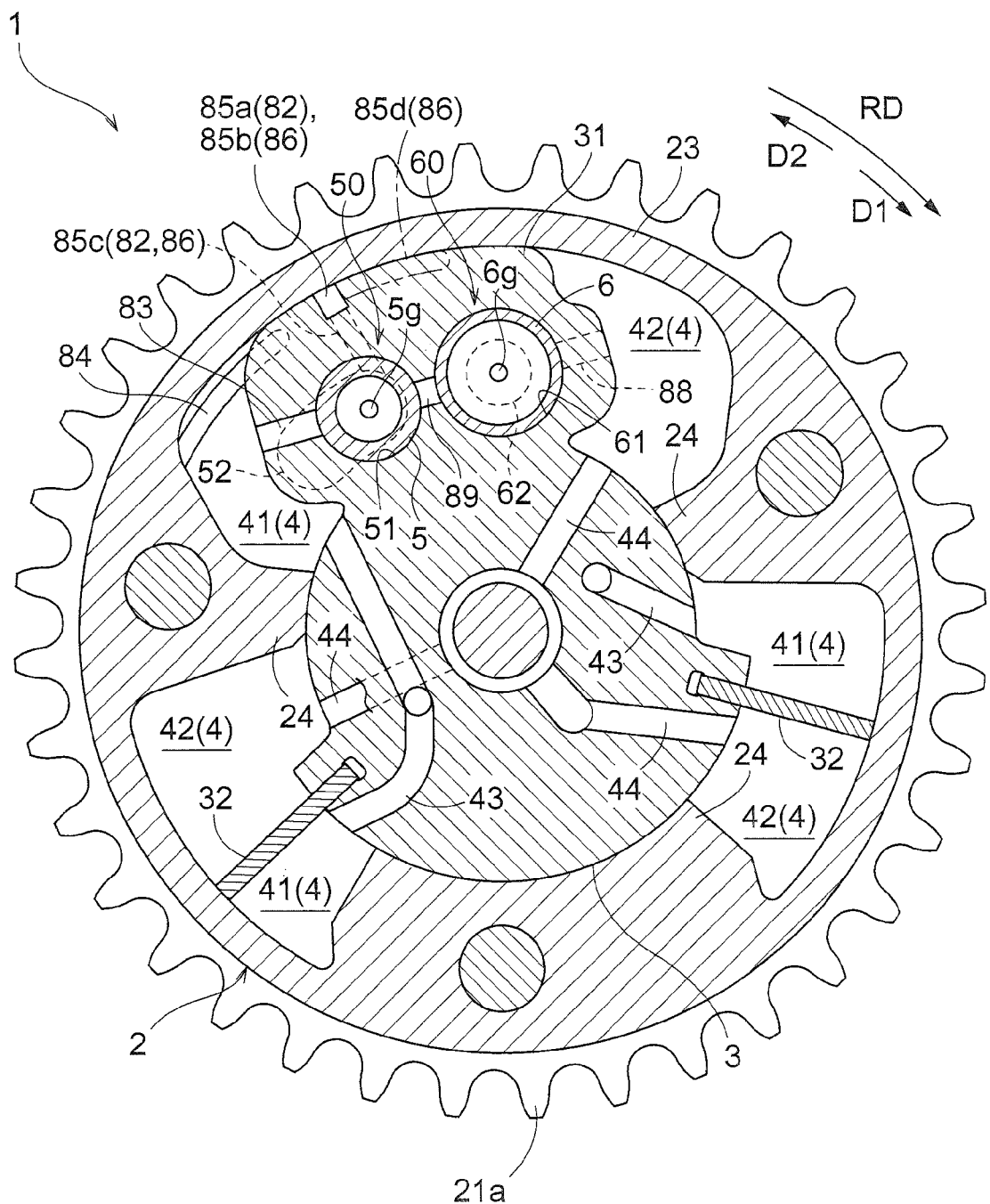
FIG. 3 is a cross-sectional view taken along the III-III line shown in FIG. 2.

When the crankshaft 18 is rotationally driven, a resulting rotational driving force is transmitted from an output sprocket 17 provided in the crankshaft 18 to a sprocket portion 21a in the rear plate 21 via a power transmission member 10, and the outer rotor 2 is rotationally driven in a direction indicated by RD in FIG. 3. The inner rotor 3 is rotationally driven in the RD direction in response to the outer rotor 2 being rotationally driven, and the camshaft 19 rotates as a result.

A plurality of projecting portions 24 that project in an inner radial direction are formed in the housing 23 of the outer rotor 2 so as to be spaced relative to each other along a circumferential direction. Hydraulic chambers 4 are formed by the projecting portions 24 and the inner rotor 3. Although the hydraulic chambers 4 are provided in three locations in the present embodiment, the invention is not limited thereto.

Each of the hydraulic chambers 4 is divided into an advance chamber 41 and a retard chamber 42 by a partition portion 31 that forms part of the inner rotor 3 or vanes 32 attached to the inner rotor 3. A restriction member 5 and a lock member (also called a locking pin) 6 are housed in a restriction member housing portion 51 and a lock member housing portion 61, respectively, that are formed in the partition portion 31, and a restriction mechanism 50 and a locking mechanism unit 60 are respectively configured of those corresponding elements. Note that in the present invention, an overall mechanism that carries out rotational displacement in the advance direction and the retard direction is called a displacement mechanism unit. The restriction mechanism 50 is also included in the displacement mechanism unit. The configurations thereof will be described later.

An advance passage 43 formed in the inner rotor 3 communicates with the advance chamber 41. Likewise, a retard passage 44 formed in the inner rotor 3 communicates with the retard chamber 42. The advance passage 43 and the retard passage 44 supply or discharge working oil to or from the advance chamber 41 and the retard chamber 42, respectively, via a hydraulic pathway 7, causing oil pressure to act on the partition portion 31 or the vanes 32 that serve as primary elements of the displacement mechanism unit. In this manner, the relative rotational phase of the inner rotor 3 relative to the outer rotor 2 is displaced in an advance direction D1 or a retard direction D2 indicated in FIG. 3, or is held at a given phase. Note that engine oil is typically used as the working oil.

A set range in which the outer rotor 2 and the inner rotor 3 can rotate relative to each other corresponds to a range over which the partition portion 31 or the vanes 32 can displace within the hydraulic chambers 4. A maximum volume of the advance chamber 41 corresponds to a maximum advance phase, and a maximum volume of the retard chamber 42 corresponds to a maximum retard phase. In other words, the relative rotational phase can change between the maximum advance phase and the maximum retard phase.

A torsion spring 8 is provided spanning across the inner rotor 3 and the front plate 22. The inner rotor 3 and the outer rotor 2 are biased by the torsion spring 8 so that the relative rotational phase displaces in the advance direction D1.

Next, the configuration of the hydraulic pathway 7 will be described. The hydraulic pathway 7 includes a hydraulic pump 71 that is driven by the engine E to supply the working oil, a solenoid-based hydraulic control valve 72 that controls the supply and discharge of the working oil to and from the advance passage 43 and the retard passage 44, a pressurizing mechanism 73 that increases the pressure of the working oil from the hydraulic pump 71, and a tank 74 that holds the working oil.

The hydraulic control valve 72 operates based on a driving signal outputted from a control unit 9. The hydraulic control valve 72 has a first position 72a at which advance control is carried out by permitting the working oil to be supplied to the advance passage 43 and permitting the working oil to be discharged from the retard passage 44, a second position 72b at which phase holding control is carried out by prohibiting the working oil from being supplied to/discharged from the advance passage 43 and the retard passage 44, and a third position 72c at which retard control is carried out by permitting the working oil to be discharged from the advance passage 43 and permitting the working oil to be supplied to the retard passage 44. The hydraulic control valve 72 operates based on a driving signal outputted from the control unit 9. The hydraulic control valve 72 according to the present embodiment is configured to carry out advance control at the first position 72a when there is no driving signal from the control unit 9.

(Restriction Mechanism)

Figure 4:
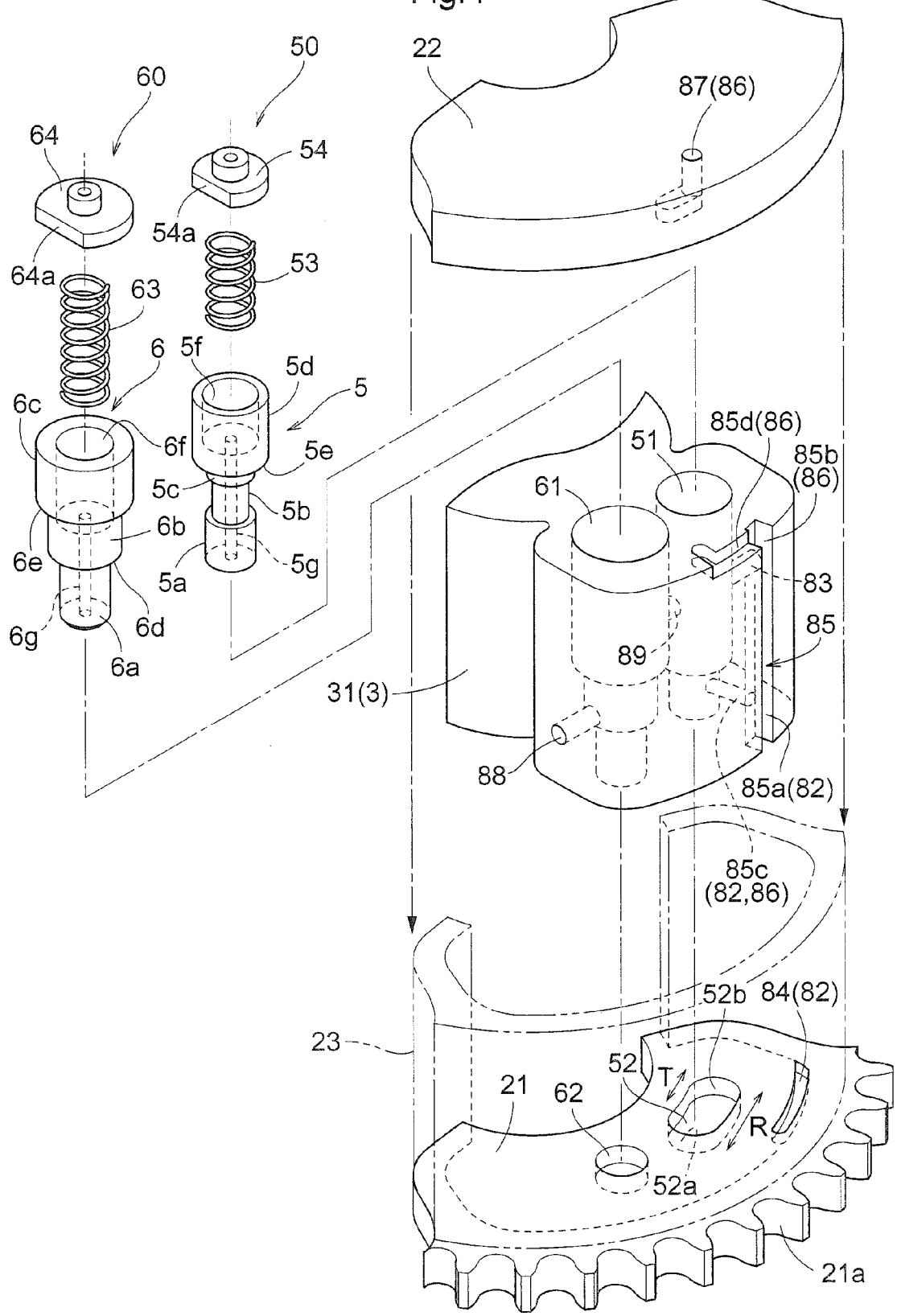
FIG. 4 is an exploded view illustrating the configuration of a restriction mechanism and a lock mechanism.

The configuration of the restriction mechanism 50 that restricts the relative rotational phase to a range from the maximum retard phase to an intermediate locked phase (called a "restriction range Lr" hereinafter) will be described based on FIG. 4. The intermediate locked phase refers to the relative rotational phase when locked by the locking mechanism unit 60, which will be mentioned later.

The restriction mechanism 50 is primarily configured of the stepped, cylindrical restriction member 5, a restriction member housing portion 51 that houses the restriction member 5, and a restriction recess 52 having a long-hole shape formed in a surface of the rear plate 21 so that the restriction member 5 can be inserted thereinto.

The restriction member 5 has a shape in which four cylinders of different diameters are stacked so as to form four steps. These cylinders forming four steps will be referred to as a first step portion 5a, a second step portion 5b, a third step portion 5c, and a fourth step portion 5d, in that order from the side where the rear plate 21 is located. The second step portion 5b is configured having a lower diameter than the first step portion 5a, and the second step portion 5b, the third step portion 5c, and the fourth step portion 5d are configured so that the diameters thereof increase in that order from the side on which the front plate 22 is located. Note that the third step portion 5c is provided to reduce the volume of a first hydraulic chamber 55 and improve the operability of the restriction member 5 when the working oil is supplied to the first hydraulic chamber 55.

The first step portion 5a is formed so as to be capable of being inserted into the restriction recess 52, and the relative rotational phase is restricted within the restriction range Lr when the first step portion 5a is inserted into the restriction recess 52. A cylindrical recess portion 5f is formed in the fourth step portion 5d, and a spring 53 is contained therein. In addition, a through-hole 5g is formed in a central area of the restriction member 5 in order to reduce the resistance of the working oil when the restriction member 5 moves in the direction of the bias and accordingly improve the operability.

A plug member 54 is provided between the restriction member 5 and the front plate 22, and a spring 53 is attached between the plug member 54 and a bottom surface of the recess portion 5f. A cutout portion 54a formed in the plug member 54 makes it possible to discharge the working oil outside of the VVT mechanism 1 through a discharge flow path, which is not shown, when the restriction member 5 moves toward the front plate 22, and contributes to improving the operability of the restriction member 5.

The restriction member housing portion 51 is formed in the inner rotor 3 along a direction of the rotational core of the camshaft 19 (called simply a "rotational core" hereinafter), and passes through the inner rotor 3 from the side on which the front plate 22 is located to the side on which the rear plate 21 is located. The restriction member housing portion 51 is formed having a shape in which, for example, two cylindrical spaces of different diameters are stacked so as to form two steps, so that the restriction member 5 can move within the inner space thereof.

The restriction recess 52 is formed having a rounded arc shape centered on the rotational core, and is formed so that a position in the radial direction thereof is slightly different from that of a locking recess 62, which will be mentioned later. The restriction recess 52 is configured so that the relative rotational phase is the intermediate locked phase when the restriction member 5 is in contact with a first end portion 52a and so that the relative rotational phase is the maximum retard phase when the restriction member 5 is in contact with a second end portion 52b. In other words, the restriction recess 52 corresponds to the restriction range Lr.

The restriction member 5 is housed within the restriction member housing portion 51 and is continually biased toward the rear plate 21 by the spring 53. When the first step portion 5a of the restriction member 5 is inserted into the restriction recess 52, the relative rotational phase is restricted to the range of the restriction range Lr, thus achieving a "restricted state". When the first step portion 5a retracts from the restriction recess 52 against the biasing force of the spring 53, the restricted state is lifted, thus achieving a "restriction-lifted state".

When the restriction member 5 is housed within the restriction member housing portion 51, the first hydraulic chamber 55 is formed between the restriction member 5 and the restriction member housing portion 51. When the working oil is supplied to the first hydraulic chamber 55 and the oil pressure acts on a first pressure receiving surface 5e, the restriction member 5 moves toward the front plate 22 against the biasing force of the spring 53, resulting in the restriction-lifted state.

A configuration of a flow path for supplying/discharging the working oil to/from the first hydraulic chamber 55 will be described later.

(Locking Mechanism Unit)

The configuration of the locking mechanism unit 60 that locks the relative rotational phase in the intermediate locked phase will be described based on FIG. 4. The locking mechanism unit 60 is primarily configured of the stepped cylindrical lock member 6, the lock member housing portion 61 that houses the lock member 6, and the round hole-shaped locking recess 62 formed in the surface of the rear plate 21 so that the lock member 6 can be inserted thereinto.

The lock member 6 has a shape in which, for example, cylinders of different diameters are stacked so as to form three steps. These cylinders forming three steps will be referred to as a first step portion 6a, a second step portion 6b, and a third step portion 6c, in that order from the side where the rear plate 21 is located. The first step portion 6a, the second step portion 6b, and the third step portion 6c are configured so that the diameters thereof increase in that order.

The first step portion 6a is formed so as to be capable of being inserted into the locking recess 62, and the relative rotational phase is locked in the intermediate locked phase when the first step portion 6a is inserted into the locking recess 62. A cylindrical recess portion 6f is formed spanning the third step portion 6c and part of the second step portion 6b, and a spring 63 is housed therein. In addition, a through-hole 6g is formed in a central area of the lock member 6 in order to reduce the resistance of the working oil when the lock member 6 moves in the direction of the bias and accordingly improve the operability.

A plug member 64 is provided between the lock member 6 and the front plate 22, and the spring 63 is attached between the plug member 64 and a bottom surface of the recess portion 6f. A cutout portion 64a formed in the plug member 64 makes it possible to discharge the working oil outside of the VVT mechanism 1 through a discharge flow path, which is not shown, when the lock member 6 moves toward the front plate 22, and contributes to improving the operability of the lock member 6.

The lock member housing portion 61 is formed in the inner rotor 3 along the direction of the rotational core, and passes through the inner rotor 3 from the side on which the front plate 22 is located to the side on which the rear plate 21 is located. The lock member housing portion 61 is formed having a shape in which cylindrical spaces of different diameters are stacked so as to form three steps, so that the lock member 6 can move within the inner space thereof.

The lock member 6 is housed within the lock member housing portion 61 and is continually biased toward the rear plate 21 by the spring 63. When the first step portion 6a of the lock member 6 is inserted into the locking recess 62, the relative rotational phase is locked in the intermediate locked phase, thus achieving a "locked state". When the first step portion 6a retracts from the locking recess 62 against the biasing force of the spring 63, the locked state is released, thus achieving a "lock-released state"

When the lock member 6 is housed within the lock member housing portion 61, a second hydraulic chamber 65 and a third hydraulic chamber 66 are formed by the lock member 6 and the lock member housing portion 61. When the working oil is supplied to the second hydraulic chamber 65 and the oil pressure acts on a second pressure receiving surface 6d, the lock member 6 moves toward the front plate 22 against the biasing force of the spring 63, resulting in the lock-released state. Meanwhile, when the working oil is supplied to the third hydraulic chamber 66 and the oil pressure acts on a third pressure receiving surface 6e, the lock member 6 is held in the lock-released state. A configuration of a flow path for supplying/discharging the working oil to/from the second hydraulic chamber 65 and the third hydraulic chamber 66 will be described later.

Next, a restriction lifting flow path, a drain flow path, a lock release flow path, and a communication flow path will be described based on FIG. 4 to FIG. 5B.

(Restriction Lifting Flow Path)

A restriction lifting flow path for achieving the restriction-lifted state includes a restriction communication channel 82 and a lifting communication channel 83. The restriction communication channel 82 is configured of a rear plate channel 84, a first through-channel 85a, and a supply path 85c, which will be mentioned later, and is a flow path for supplying the working oil to the first hydraulic chamber 55 in order to lift the restricted state. Meanwhile, the lifting communication channel 83 is a channel for supplying the working oil to the first hydraulic chamber 55 in order to hold the restriction-lifted state when the restriction member 5 is retracted from the restriction recess 52.

The rear plate channel 84 is a groove-shaped channel formed in a surface of the rear plate 21 on the side toward the inner rotor 3, and communicates with the advance chamber 41. The rear plate channel 84 is configured to be capable of communicating with the first through-channel 85a that forms part of a rotor channel 85, only when the restriction member 5 is within a predetermined range on the advance-side of the restriction range Lr (called a "restriction liftable range Lt" hereinafter). Note that the restriction member 5 being within the range of the restriction liftable range Lt corresponds to the first step portion 5a being completely located within the region of the restriction liftable range Lt.

The rotor channel 85 is a channel formed in the inner rotor 3, and is configured of the first through-channel 85a, a second through-channel 85b, the supply path 85c, and a discharge path 85d. The first through-channel 85a and the second through-channel 85b are formed in a side surface of the inner rotor 3 on the outer side thereof in the radial direction, and are formed so as to form a continuous straight line along the direction of the rotational core. An end portion of the first through-channel 85a on the side thereof toward the rear plate 21 is configured to communicate with the rear plate channel 84 when the restriction member 5 is within the restriction liftable range Lt. Meanwhile, an end portion of the second through-channel 85b on the side thereof toward the front plate 22 is connected to the discharge path 85d. The supply path 85c branches at a border area between the first through-channel 85a and the second through-channel 85b, and communicates with the first hydraulic chamber 55. The discharge path 85d is formed in the surface of the inner rotor 3 on the side thereof located toward the front plate 22, in an L shape when viewed from above, and is configured to communicate with a discharge hole 87, which will be mentioned later, only when the restriction member 5 is in a predetermined area on the advance-side of the restriction liftable range Lt.

As described above, the restriction communication channel 82 is configured of the rear plate channel 84, the first through-channel 85a, and the supply path 85c. Accordingly, when the restriction member 5 is within the restriction liftable range Lt, the rear plate channel 84 and the first through-channel 85a communicate with each other, causing the restriction communication channel 82 to communicate with the first hydraulic chamber 55 and the working oil to be supplied thereto; as a result, the oil pressure acts on the first pressure receiving surface 5e and the restricted state is lifted.

The lifting communication channel 83 is a pipe-shaped channel formed in the inner rotor 3, and communicates with the advance chamber 41. When the restriction member 5 retracts from the restriction recess 52 and the restriction-lifted state is achieved, the lifting communication channel 83 communicates with the first hydraulic chamber 55 and supplies the working oil from the advance chamber 41; as a result, the oil pressure acts on the first pressure receiving surface 5e and the restriction-lifted state is held.

Note that the configuration is such that when the restriction member 5 moves toward the front plate 22 against the biasing force of the spring 53, the communication between the supply path 85c and the first hydraulic chamber 55 is cut off by the first step portion 5a at the timing when the lifting communication channel 83 communicates with the first hydraulic chamber 55. In other words, the channel that supplies the working oil to the first hydraulic chamber 55 is configured to alternate between the restriction communication channel 82 and the lifting communication channel 83. According to this configuration, in the case where the working oil is to be discharged from the first hydraulic chamber 55, the supply of the working oil from the lifting communication channel 83 can be cut off while still discharging the working oil from the first hydraulic chamber 55 via the supply path 85c (which is part of a drain oil path 86, which will be mentioned later).

However, strictly speaking, the configuration is such that the working oil is supplied to the first hydraulic chamber 55 from both the restriction communication channel 82 and the lifting communication channel 83 when switching between the restriction communication channel 82 and the lifting communication channel 83. This is to prevent a situation where neither the restriction communication channel 82 nor the lifting communication channel 83 is connected to the first hydraulic chamber 55 when switching between those communication channels, causing the first hydraulic chamber 55 to become temporarily sealed and losing the smoothness of the restriction/lifting operations of the restriction member 5.

(Drain Flow Path)

A drain flow path 86 is a channel for reducing movement resistance of the restriction member 5 and quickly discharging the working oil within the first hydraulic chamber 55 when the restriction member 5 is inserted into the restriction recess 52. The drain flow path 86 is configured of the supply path 85c, the second through-channel 85b, the discharge path 85d, and the discharge hole 87. The discharge hole 87 is formed to pass through the front plate 22 along the direction of the rotational core.

The drain flow path 86 is configured so as to communicate only when the restriction member 5 is in a predetermined range on the advance-side from the restriction liftable range Lt and to not communicate when the restriction member 5 is within the restriction liftable range Lt. According to this configuration, the working oil supplied from the advance chamber 41 is prevented from being discharged directly through the drain flow path 86 when the rear plate channel 84 and the first through-channel 85a communicate.

(Lock Release Flow Path)

The lock release flow path 88 is a pipe-shaped channel formed in the inner rotor 3, and communicates with the retard chamber 42. The lock release flow path 88 is a flow path for supplying the working oil to the second hydraulic chamber 65 from the retard chamber 42 and causing the oil pressure to act on the second pressure receiving surface 6d, which in turn causes the lock member 6 to retract from the locking recess 62.

(Communication Flow Path)

A communication flow path 89 is a pipe-shaped channel formed in the inner rotor 3, and is configured so that the first hydraulic chamber 55 and the third hydraulic chamber 66 communicate when the lock member 6 has moved toward the front plate 22 by a certain amount during the restriction-lifted state. When the lifting communication channel 83, the first hydraulic chamber 55, the communication flow path 89, and the third hydraulic chamber 66 communicate, the working oil supplied to the first hydraulic chamber 55 from the advance chamber 41 is also supplied to the third hydraulic chamber 66, and thus the restriction-lifted state and the lock-released state can be held.

(Operations During Lock Release and Restriction Lift)

A procedure for releasing the locked state using the restriction mechanism 50, the locking mechanism unit 60, and the respective flow channels described above will be described based on FIG. 5A to FIG. 8B.

Figure 5A:
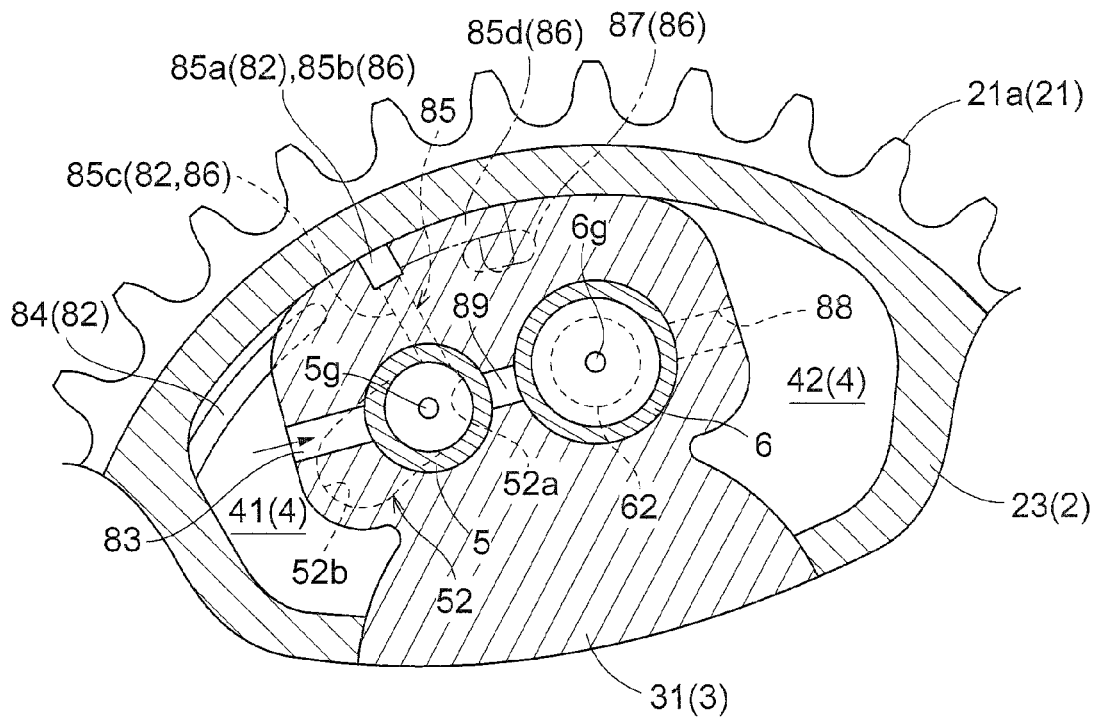
FIG. 5A is a plan view illustrating states of the restriction mechanism and the lock mechanism when an engine is started.
Figure 5B:
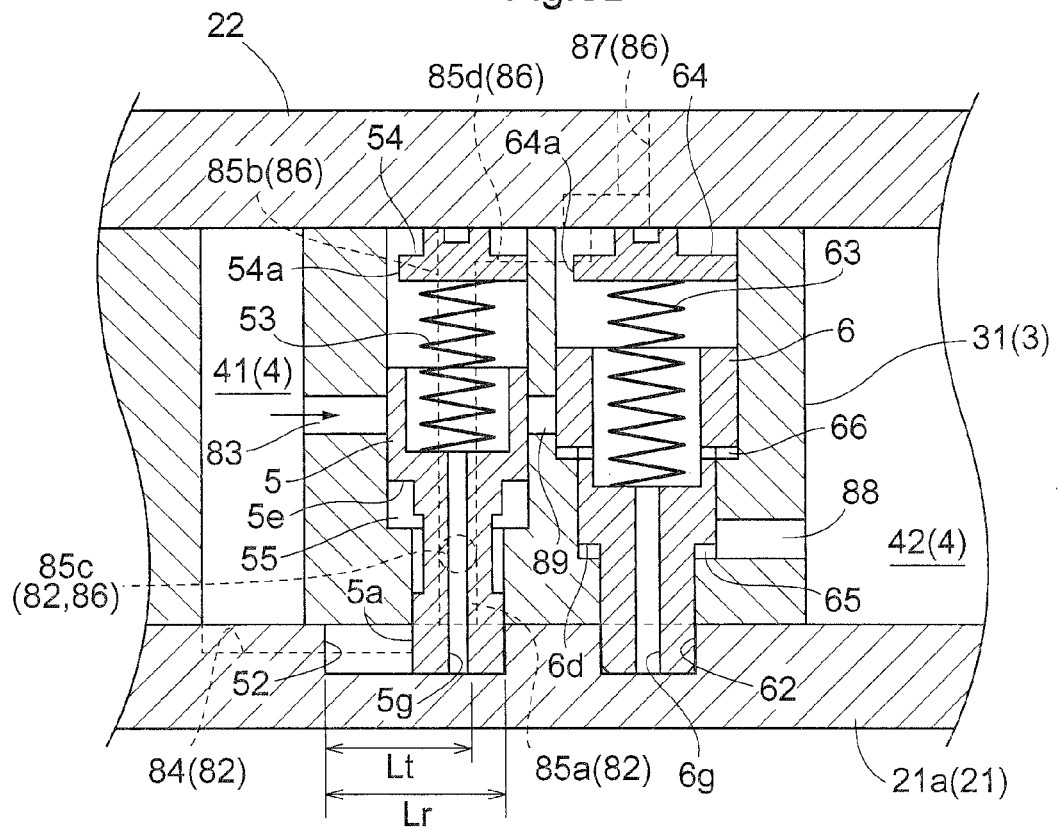
FIG. 5B is a cross-sectional view illustrating states of the restriction mechanism and the lock mechanism when the engine is started.

FIG. 5A and FIG. 5B illustrate a state occurring when the engine is started. When the engine is started, the hydraulic control valve 72 is at the first position 72a, and thus advance control is carried out. However, because the restriction member 5 is outside of the range of the restriction liftable range Lt, the working oil is not supplied to the first hydraulic chamber 55 from the restriction communication channel 82. In addition, because the lifting communication channel 83 also does not communicate with the first hydraulic chamber 55, the working oil is not supplied to the first hydraulic chamber 55. Accordingly, the locked state is maintained.

Figure 6A:
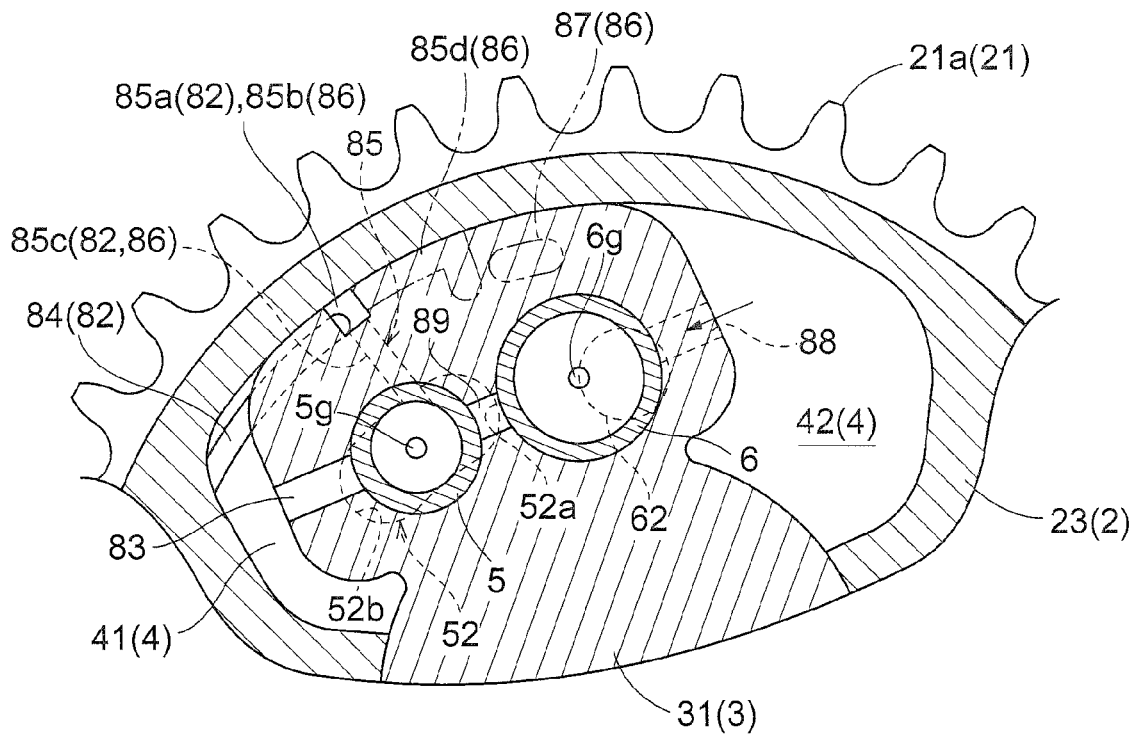
FIG. 6A is a plan view illustrating states of the restriction mechanism and the lock mechanism when a locked state is released.
Figure 6B:
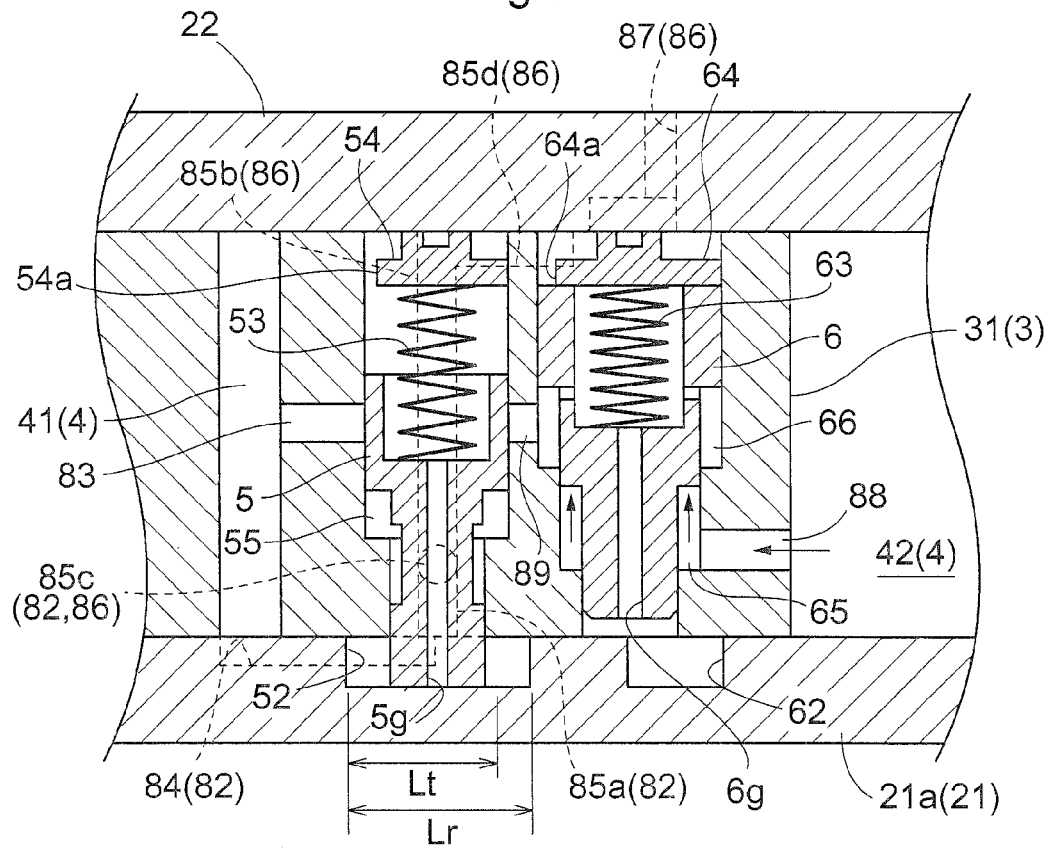
FIG. 6B is a cross-sectional view illustrating states of the restriction mechanism and the lock mechanism when the locked state is released.

FIG. 6A and FIG. 6B illustrate a state after the engine has started, when the control has first been switched to retard control in order to release the locked state. At this time, the working oil is supplied to the second hydraulic chamber 65 from the retard chamber 42 via the lock release flow path 88, the lock member 6 retracts from the locking recess 62, and the locked state is released. The restriction member 5 moves in the retard direction within the restriction recess 52 when the locked state is released.

Figure 7A:
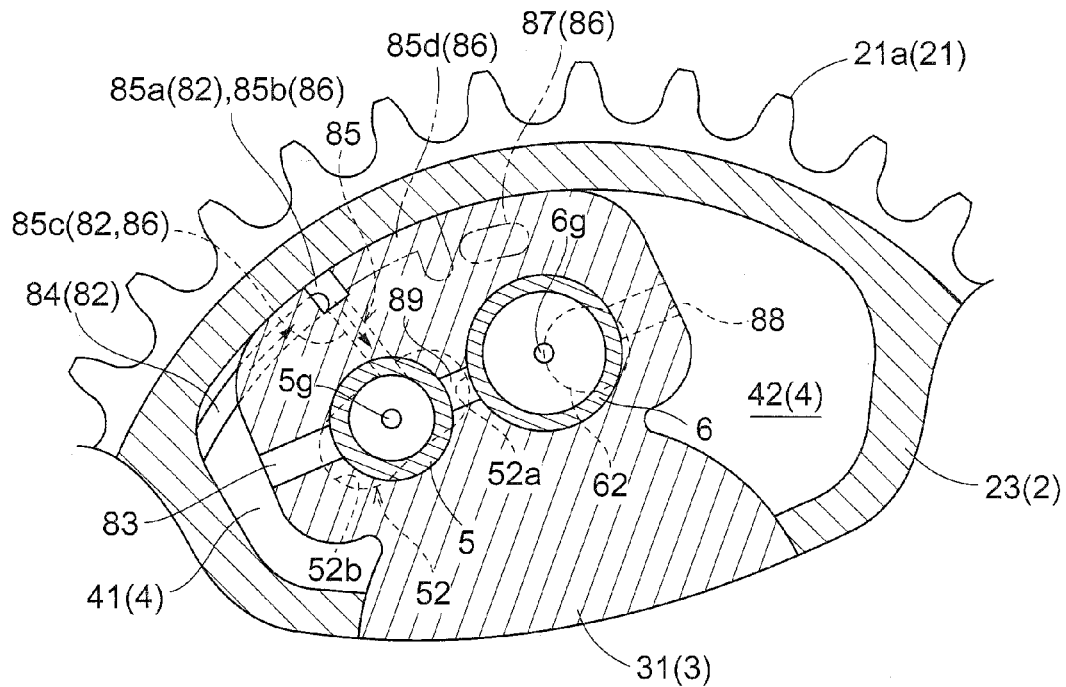
FIG. 7A is a plan view illustrating states of the restriction mechanism and the lock mechanism when a restricted state is lifted.
Figure 7B:
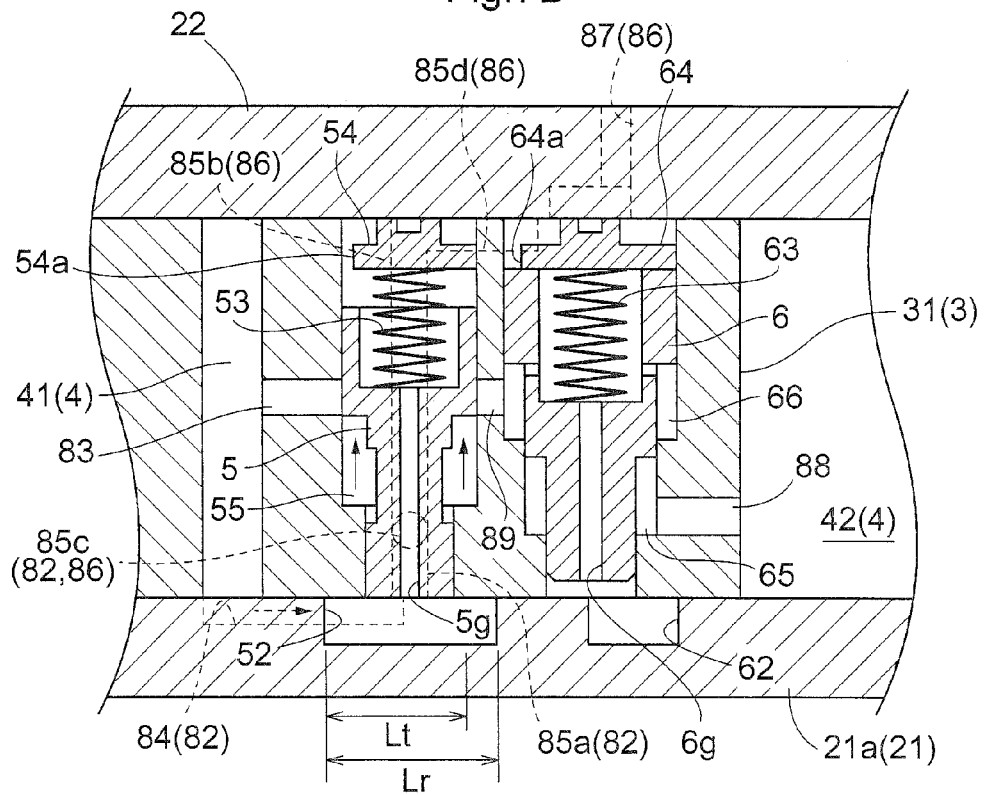
FIG. 7B is a cross-sectional view illustrating states of the restriction mechanism and the lock mechanism when the restricted state is lifted.

When a phase sensor, which is not shown, detects that a relative rotational phase in which the restriction member 6 is located within the range of the restriction liftable range Lt has been achieved, an ECU 73 switches to advance control. This state is shown in FIG. 7A and FIG. 7B. The rear plate channel 84 and the first through-channel 85a communicate, and thus the working oil is supplied to the first hydraulic chamber 55 from the restriction communication channel 82. As a result, the restriction member 5 retracts from the restriction recess 52 and the restricted state is lifted.

Figure 8A:
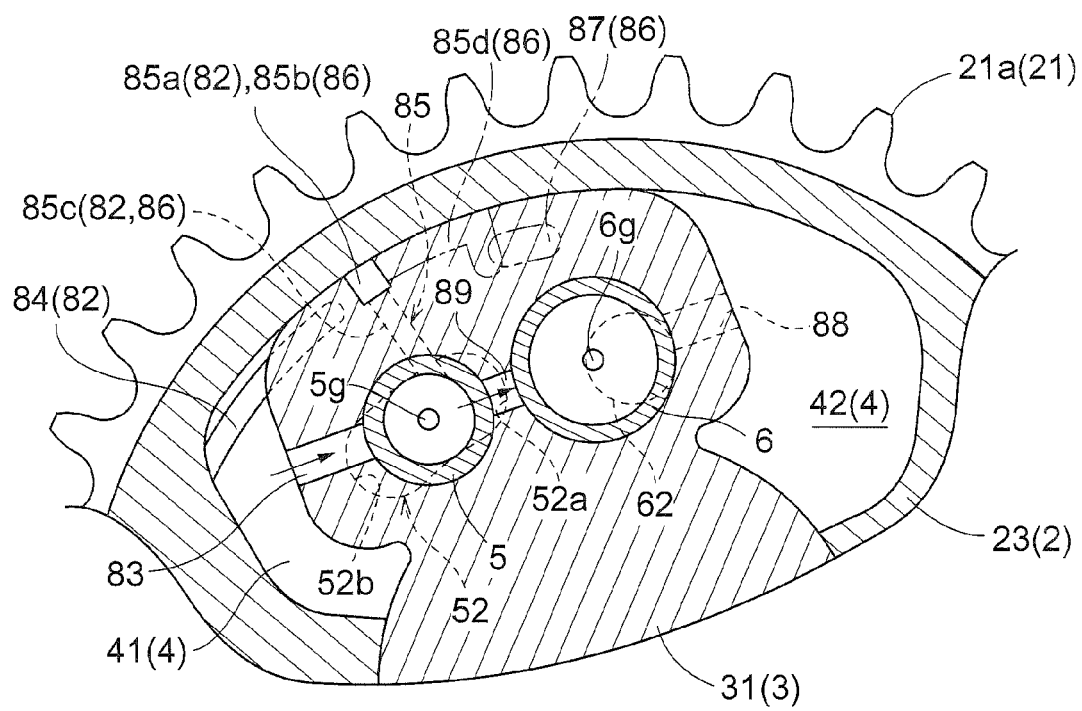
FIG. 8A is a plan view illustrating states of the restriction mechanism and the lock mechanism when holding a restriction-lifted state and a lock-released state.
Figure 8B:
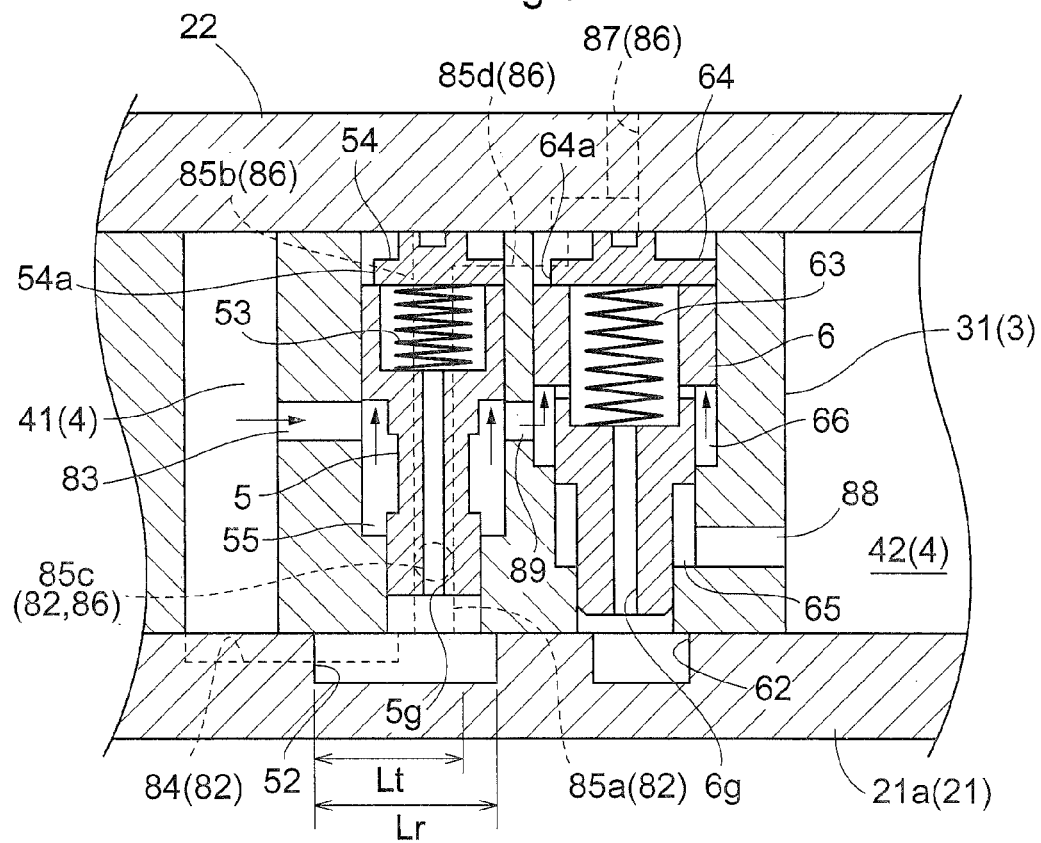
FIG. 8B is a cross-sectional view illustrating states of the restriction mechanism and the lock mechanism when holding the restriction-lifted state and a lock-released state.

FIG. 8A and FIG. 8B illustrate a state in which the restriction-lifted state and the lock-released state are held as a result of the advance control. At this time, the first hydraulic chamber 55 and the third hydraulic chamber 66 communicate via the communication flow path 89, and thus the working oil supplied to the first hydraulic chamber 55 from the advance chamber 41 is also supplied to the third hydraulic chamber. As a result, the restriction-lifted state and the lock-released state are held.

(Operations During Normal Driving State)

Next, operations performed in a normal driving state where the restriction-lifted state and the lock-released state are achieved through the aforementioned procedures will be described based on FIG. 9A to FIG. 10B.

Figure 9A:
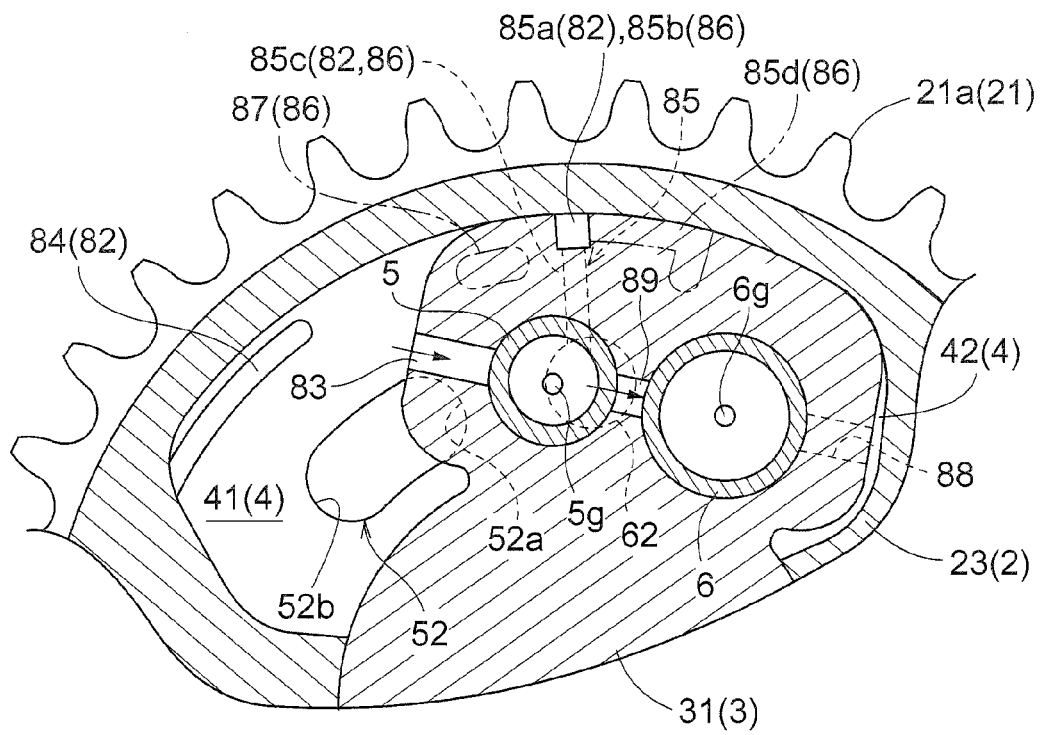
FIG. 9A is a plan view illustrating states of the restriction mechanism and the lock mechanism during advance control in a normal driving state.
Figure 9B:
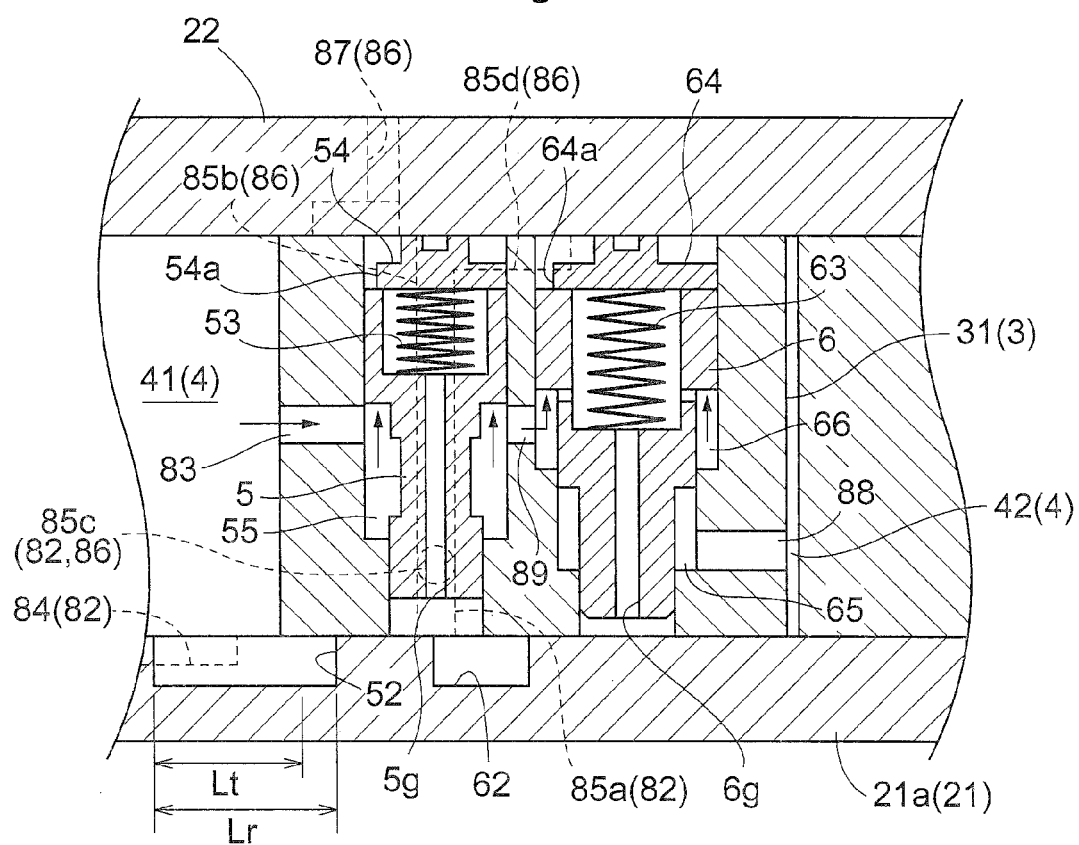
FIG. 9B is a cross-sectional view illustrating states of the restriction mechanism and the lock mechanism during advance control in the normal driving state.

FIG. 9A and FIG. 9B illustrate a state occurring when the advance control is carried out during the normal driving state. As described above, during the advance control, the advance chamber 41, the lifting communication channel 83, the first hydraulic chamber 55, the communication flow path 89, and the third hydraulic chamber 66 communicate, and thus advance operations occur in a state where the restriction-lifted state and the lock-released state are held.

Figure 10A:
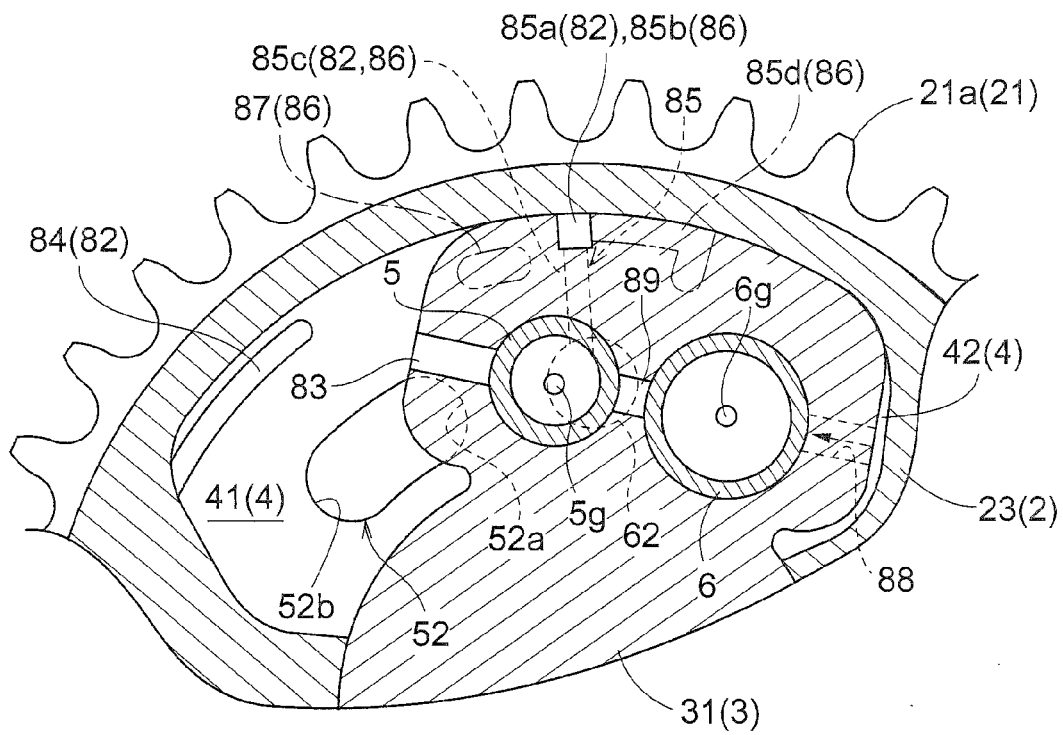
FIG. 10A is a plan view illustrating states of the restriction mechanism and the lock mechanism during retard control in the normal driving state.
Figure 10B:
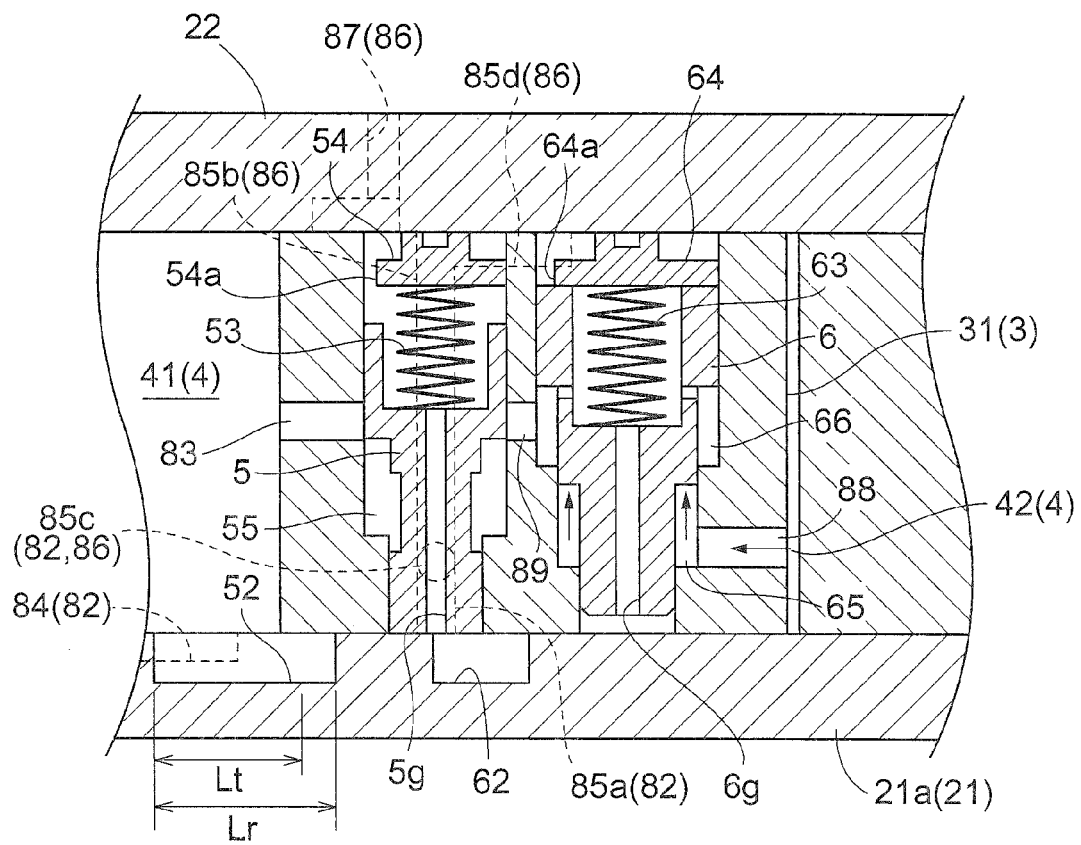
FIG. 10B is a cross-sectional view illustrating states of the restriction mechanism and the lock mechanism during retard control in the normal driving state.

FIG. 10A and FIG. 10B illustrate a state occurring when the retard control is carried out during the normal driving state. At this time, the working oil is supplied to the second hydraulic chamber 65 from the retard chamber 42, and thus the lock-released state is held. On the other hand, the working oil is not supplied to the first hydraulic chamber 55, and thus the restriction member 5 is biased by the spring 53 and makes contact with the rear plate 21. However, because the restriction member 5 slides along the surface of the rear plate 21, the driving is not interfered with. Furthermore, because the restriction recess 52 and the locking recess 62 are formed in positions that are shifted in the radial direction, the restriction member 5 does not enter into the locking recess 62.

(Operations During Restriction and Locking)

Finally, a procedure for entering the locked state after achieving the restricted state will be described based on FIG. 11A to FIG. 13B.

Figure 11A:
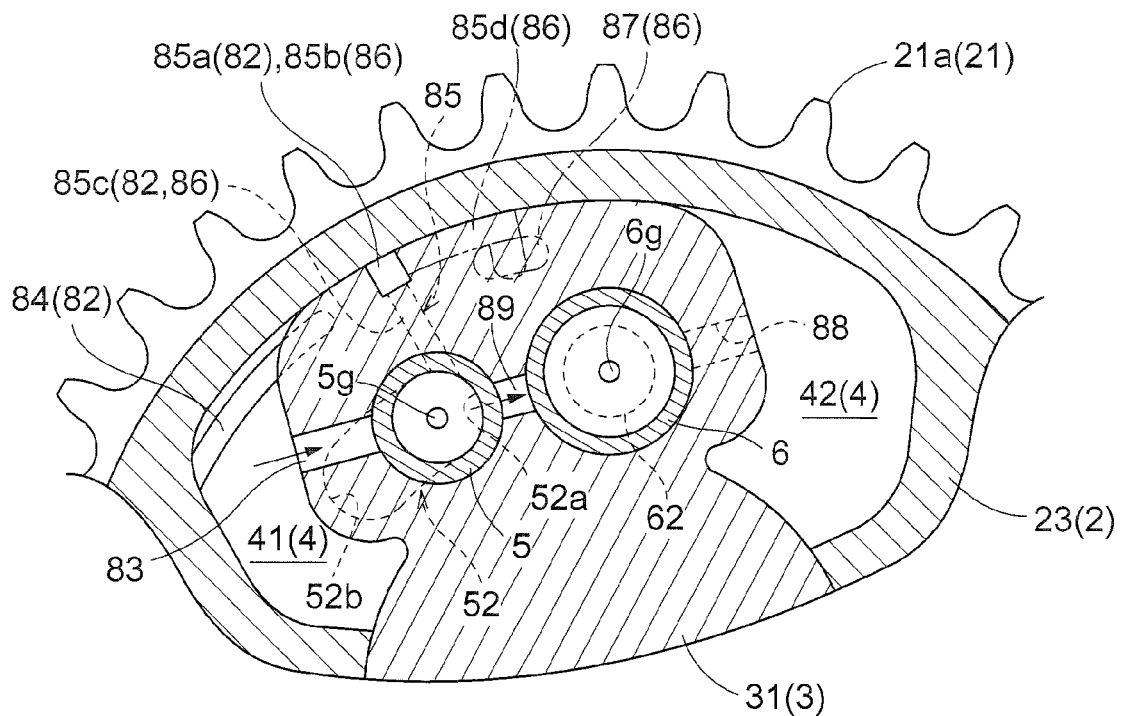
FIG. 11A is a plan view illustrating states of the restriction mechanism and the lock mechanism when starting a locking operation.
Figure 11B:
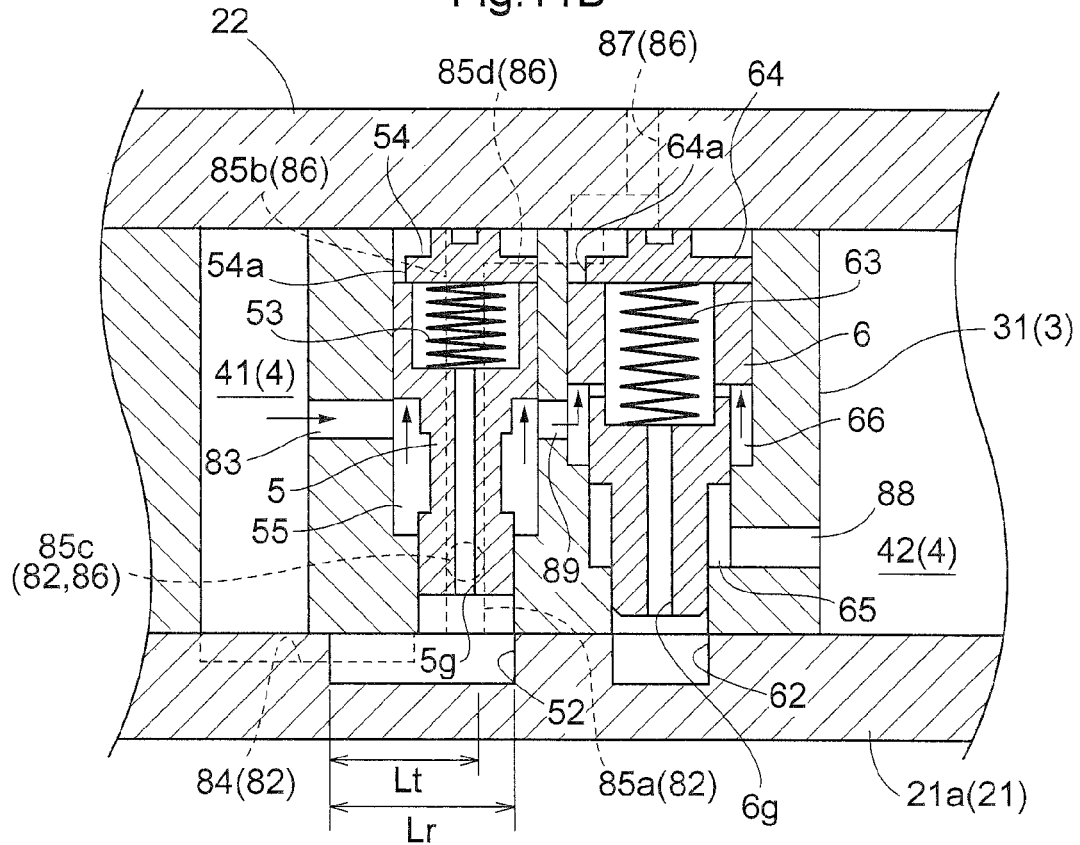
FIG. 11B is a cross-sectional view illustrating states of the restriction mechanism and the lock mechanism when starting the locking operation.

FIG. 11A and FIG. 11B illustrate a state in which the discharge path 85d and the discharge hole 87 communicate and the phase is rotated to a position where the drain flow path 86 functions, as a result of the advance control. At this time, the working oil is supplied to the first hydraulic chamber 55 and the third hydraulic chamber 66 from the advance chamber 41, and thus the restriction-lifted state and the lock-released state are held. Because the drain flow path 86 is communicating, the working oil can be discharged from the first hydraulic chamber 55 and the restricted state can be achieved quickly when the restriction member 5 is inserted into the restriction recess 52 according to the following procedure.

FIG. 12A and FIG. 12B illustrate a state in which the control is switched to the retard control and the restricted state is achieved. If the retard control is maintained even after the restriction member 5 is inserted into the restriction recess 52, the restriction member 5 will be located within the restriction liftable range Lt, and the restricted state will be lifted the next time the control is switched to the advance control. Accordingly, after the restricted state has been achieved, it is necessary to switch to advance control before the restriction member 5 is located within the range of the restriction liftable range Lt and the rear plate channel 84 and the first through-channel 85a communicate with each other.

Figure 13A:
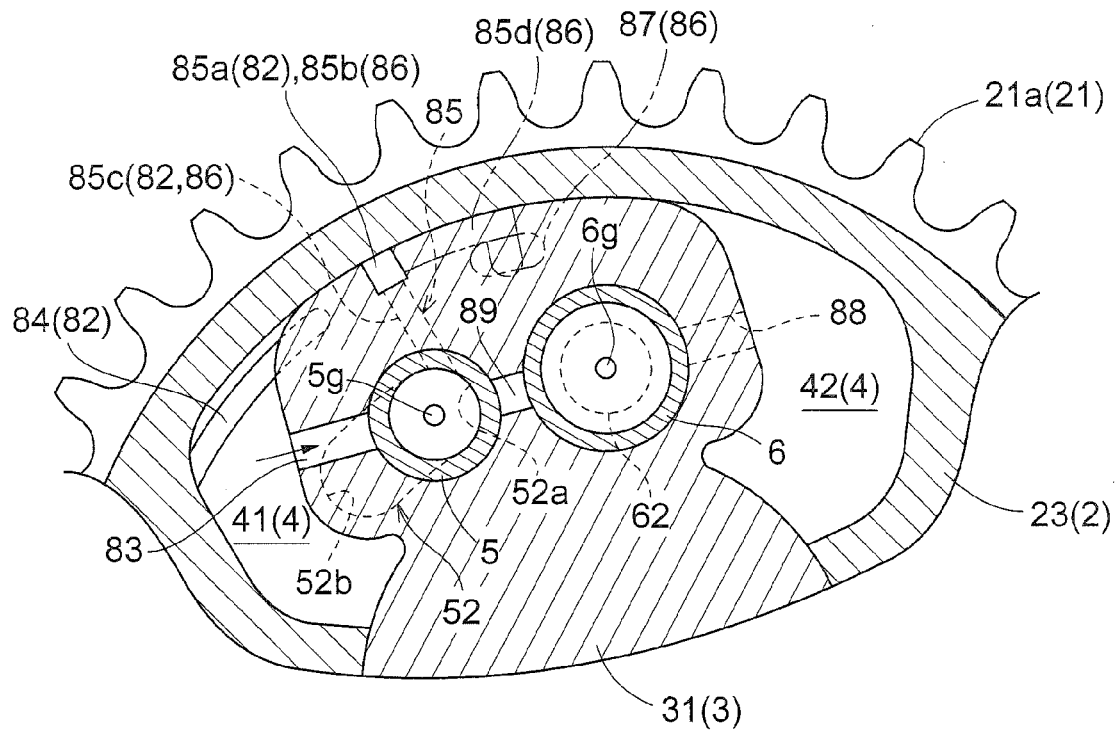
FIG. 13A is a plan view illustrating states of the restriction mechanism and the lock mechanism during the locked state.
Figure 13B:
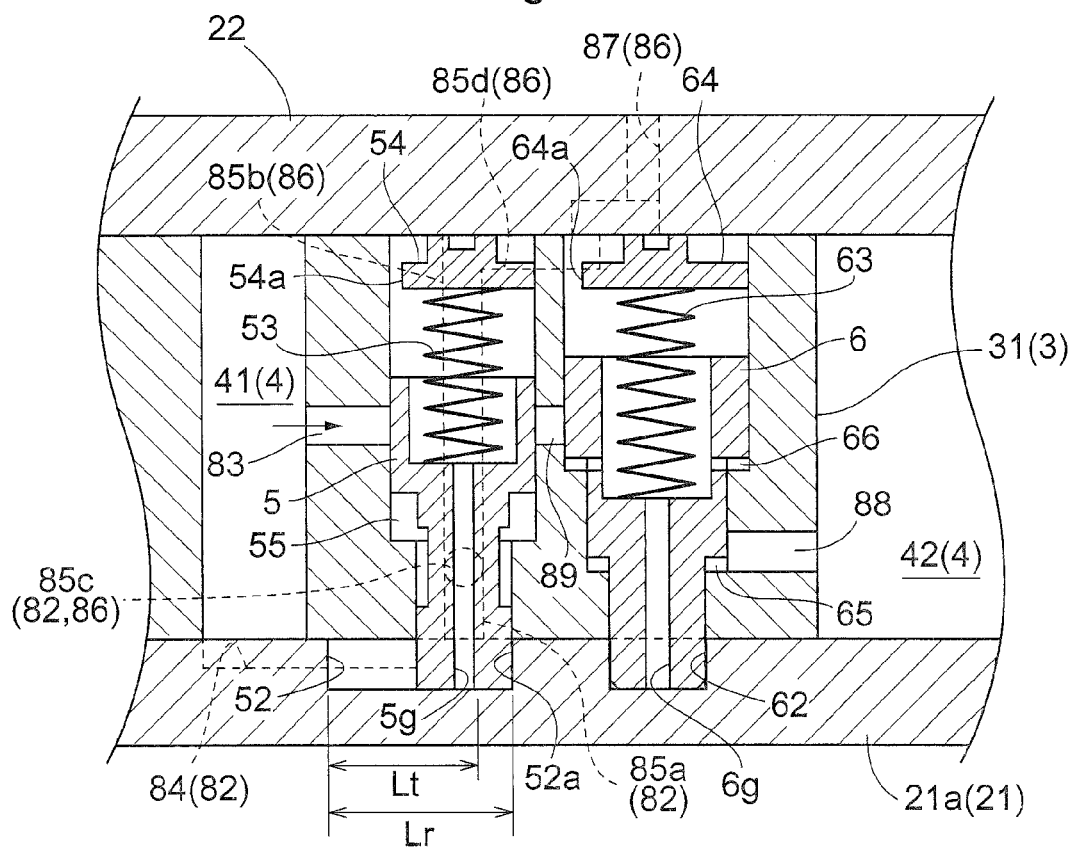
FIG. 13B is a cross-sectional view illustrating states of the restriction mechanism and the lock mechanism during the locked state.

If the control is switched to the advance control before the restriction member 5 enters the restriction liftable range Lt, the working oil will not be supplied to the first hydraulic chamber 55, and thus the advance operations will be carried out without the restriction member 5 being retracted from the restriction recess 52. As a result, the restriction member 5 makes contact with the first end portion 52a of the restriction recess 52. At this time, the supply of the working oil to the communication flow path 89 is cut off; accordingly, the lock member 6 is biased by the spring 63, enters into the locking recess 62, and the locked state illustrated in FIG. 13A and FIG. 13B is achieved.

Figure 14:
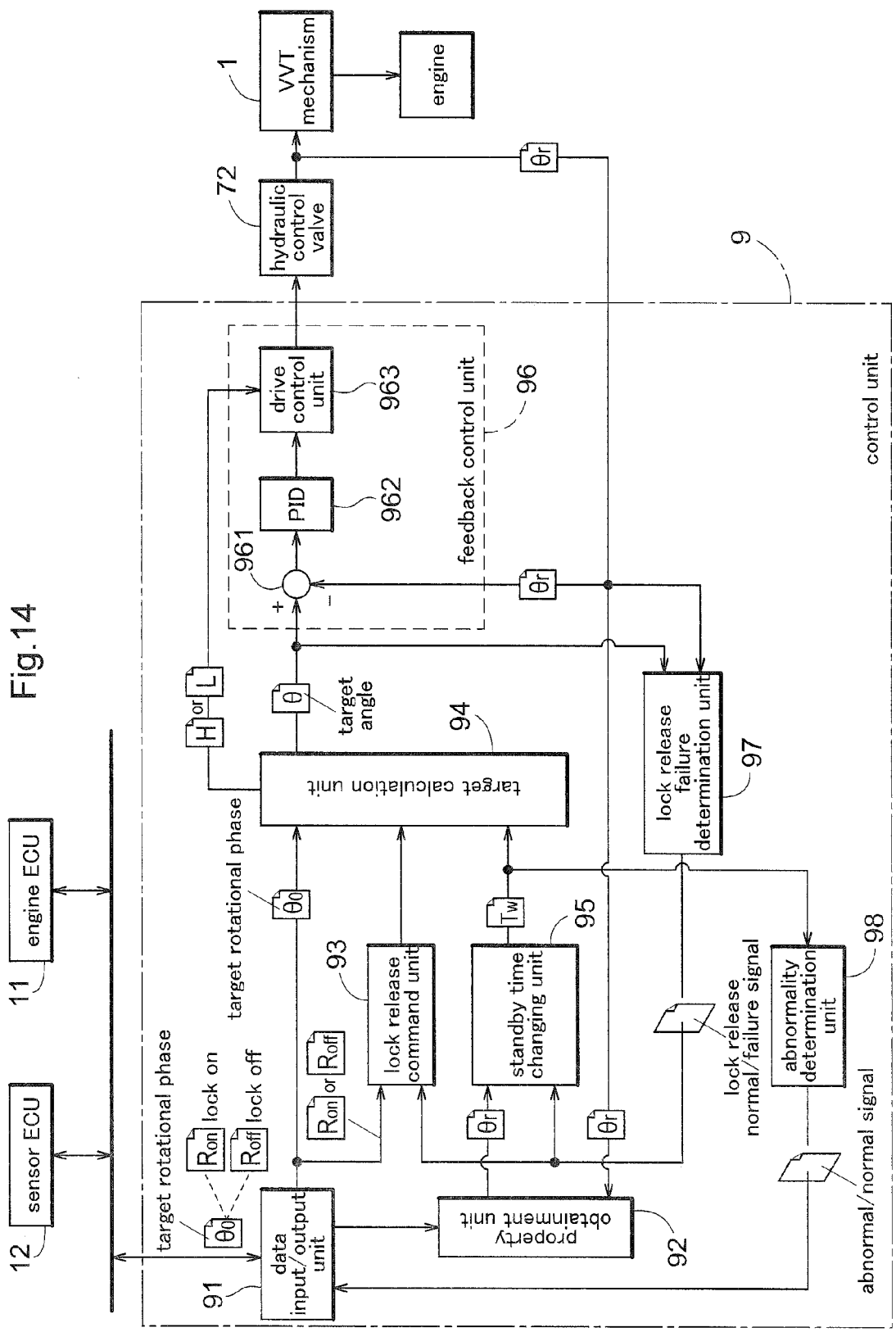
FIG. 14 is a functional block diagram illustrating functions of a control unit.

The control unit 9, which controls the displacement mechanism unit and the locking mechanism unit of the VVT mechanism 1 configured as described above based on operational instructions from the engine ECU 11, will be described using the functional block diagram in FIG. 14. In this embodiment, it is assumed that the operational instructions from the engine ECU 11 include a base target angle (rotational phase) and on/off information for the locking operation or the lock release operation at that operational stage. The on/off information for the locking operation or the lock release operation may be determined by the control unit 9 based on the base target angle.

The control unit 9 includes a data input/output unit 91, a property obtainment unit 92, a lock release command unit 93, a target calculation unit 94, a standby time changing unit 95, a feedback control unit 96, a lock release failure determination unit 97, and an abnormality determination unit 98. The data input/output unit 91 receives the base target angle sent from the engine ECU 11 and other data from the ECU and the like, which is not shown, and transfers the data to the various functional units in the control unit 9 that request the data. The base target angle: θ0 from the engine ECU 11 is transferred to the target calculation unit 94, and on/off information: Ron, Roff for the locking operation or the lock release operation read from the base target angle: θ0 is transferred to the lock release command unit 93.

The property obtainment unit 92 can have a function for obtaining the engine RPM, the oil temperature, and the like from a sensor ECU 12, as well as the actual angle (indicated by θr in the drawings), as the property information regarding the hydraulic properties of the hydraulic pathway 7. In this embodiment, the property obtainment unit 92 includes a differentiator 921 that computes the rotational displacement change rate: λ of the VVT mechanism 1 based on the actual angle obtained over time and an oil pressure estimation unit 922 that estimates the oil pressure based on the rotational displacement change rate: λ, as shown in FIG. 15.

The lock release command unit 93 takes a lock release normality signal, a lock release failure, and so on from the lock release failure unit 97 and the on/off information for the locking operation or the lock release operation as inputs, and outputs a lock release command.

The target calculation unit 94 calculates the target angle based on the base target angle received from the data input/output unit 91, the on/off information for the locking operation or the lock release operation received from the lock release command unit 93, the standby time received from the standby time changing unit 95, and so on. Note that the target calculation unit 94 according to this embodiment also outputs a signal for changing the responsiveness of hydraulic control depending on whether the lock release operation or the locking operation is being carried out in the rotational phase displacement control (indicated by H or L in the drawings).

Figure 15:
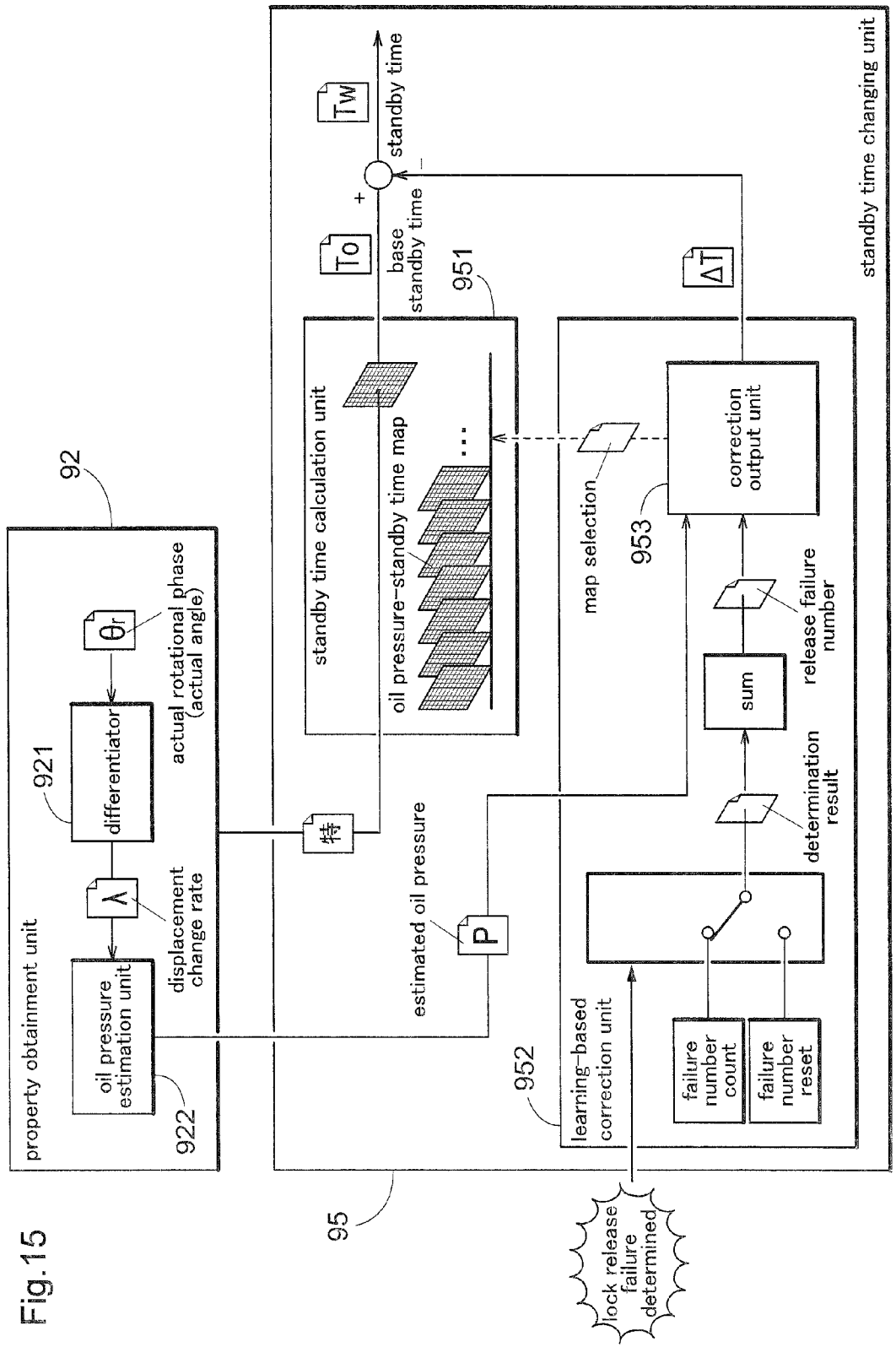
FIG. 15 is a functional block diagram illustrating functions of a standby time changing unit.

As is illustrated in detail in FIG. 15, the standby time changing unit 95 includes a standby time calculation unit 951 and a learning-based correction unit 952. The standby time calculation unit 951 calculates a base standby time using an oil pressure-standby time map, with the property information obtained from the property obtainment unit 92 serving as input parameters. Note that in this embodiment, a plurality of oil pressure-standby time maps are prepared, and the oil pressure-standby time map to be used is selected based on map selection information from the learning-based correction unit 952. The selection of the oil pressure-standby time map may simply be carried out based on an estimated oil pressure from the oil pressure estimation unit 922. The learning-based correction unit 952 counts a number of lock release failures outputted from the lock release failure determination unit 97, and a correction output unit 953 calculates the correction amount based on the counted number of lock release failures and the estimated oil pressure. The correction amount, too, may be calculated based only on the number of lock release failures. The algorithm for this calculation can be constructed as a known learning type.

The lock release failure can be detected as the actual angle not changing, and thus the target angle and the actual angle are inputted to the lock release failure determination unit 97; the lock release failure determination unit 97 determines whether or not a lock release failure has occurred based on a lack of change in the actual angle at a predetermined timing.

The feedback control unit 96 includes a deviation calculation unit 961, a PID controller 962, and a drive control unit 963. The deviation calculation unit 961 calculates a deviation based on a difference between the target angle sent from the target calculation unit 94 and the actual angle serving as the control amount. The PID controller 962 takes the deviation as an input and outputs an operation amount, as is well-known. Note that another type of controller may be employed instead of the PID controller. Based on the operation amount outputted from the PID controller 962, the drive control unit 963 generates and outputs a driving signal (a PWM signal, in this embodiment) that drives the solenoid of the hydraulic control valve 72 in the VVT mechanism 1.

Figure 16:
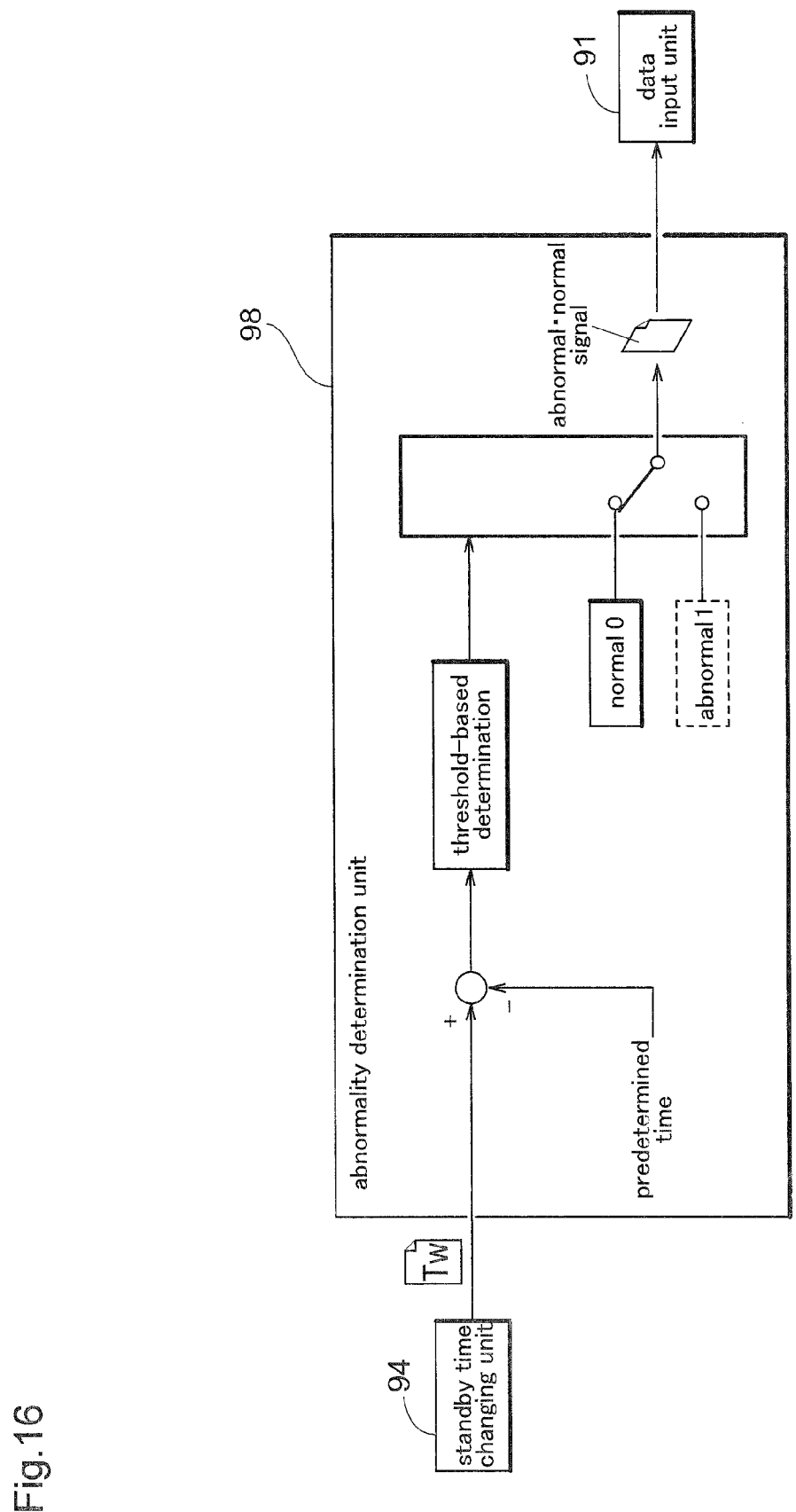
FIG. 16 is a functional block diagram illustrating functions of an abnormality determination unit.

As shown in FIG. 16, the abnormality determination unit 98 employs a threshold-based determination, detecting an abnormality when the standby time calculated by the standby time changing unit 94 exceeds a predetermined time set in advance. An abnormal signal is outputted instead of a normal signal when an abnormality is detected. The abnormal signal and the normal signal are generally implemented as an abnormal flag or a normal flag.

An example of a rotational phase control routine for the VVT mechanism 1 embodying the valve timing adjusting system according to the present invention configured as described thus far will be described using the flowcharts in FIG. 17 to FIG. 19.

When this routine starts, first, it is checked whether or not an optimal angle (the target angle) of the rotational phase relative to the VVT mechanism 1 immediately after the engine is started is on the advance-side (#31). If the check indicates the advance-side (Yes in #31), it is necessary to release the lock, and thus the lock release command is set (#32). In the next step, it is checked whether or not the lock release command is set (#33). If the lock release command is set (Yes in #33), a standby time calculation process is executed (#40). The standby time calculation process will be described below; in this process, a standby time that suspends the displacement of the rotational phase until the locking pin exits the locking recess on a retard-side of the locked position that corresponds to an intermediate position (the intermediate rotational phase) is calculated, and the rotational phase displacement is caused to stand by.

Upon entering the standby time calculation process (#40) shown in FIG. 18, first, a predetermined angle in a retard region is set as the target angle (#41). Next, the actual angle, corresponding to the current control amount, is loaded (#42). A differential value from actual angle to actual angle obtained over time, or in other words, a change amount in the rotational phase displacement, is computed (#43). The oil pressure is estimated based on the computed change amount in the rotational phase displacement (#44), and based on the estimated oil pressure, the standby time is derived using the oil pressure-standby time map (#45). Here, it is checked whether or not a lock release failure signal is present, or in other words, whether or not a lock release failure flag is set (#46). If the lock release failure signal is not present (No in #46), the standby time calculation process ends there; if the lock release failure signal is present (Yes in #46), the standby time is corrected so as to be extended, and the standby time calculation process then ends.

Returning from the standby time calculation process, it is checked whether the standby time calculated in the standby time calculation process has also elapsed in the predetermined angle position (predetermined rotational displacement position) of the retard region set in the standby time calculation process (#51). If the standby time has elapsed (Yes in #51), the target angle is set to an optimal angle of the VVT mechanism 1 (#52). Furthermore, a lock failure determination process, described below, is executed (#60). In the case where the standby time has not elapsed by the time the check is carried out in step #51 (No in #51), the target angle setting of step #52 and the lock failure determination process of #60 are omitted.

Upon entering the lock failure determination process (#60) shown in FIG. 19, first, it is checked whether or not a predetermined amount of time has elapsed with the set target angle on the advance-side and the actual angle being "0" (meaning the intermediate rotational phase position, or in other words, the intermediate locked position) (#61). The lock failure determination process is a process that determines a lock release failure has occurred if, during the rotational phase displacement process from the intermediate locked position toward the advance direction, the lock is not released and the rotational phase does not displace from the intermediate locked position even after a predetermined amount of time has passed. Accordingly, in the case where the check in step #61 indicates Yes, it is determined that a lock release failure has occurred and the lock release failure signal is outputted or the lock release failure flag is set (#62). Furthermore, the number of lock release failures is counted, the correction amount for the standby time is calculated based on the count value and the estimated oil pressure, and the failure determination process ends (#63).

In the case where the check in step #61 indicates No, it is determined that a lock release failure has not occurred; the lock release command is cleared (#64) and the lock release failure signal is also cleared (#65). Furthermore, the standby time correction amount is reset to "0" and the failure determination process ends (#66).

Upon returning from the lock failure determination process, the actual angle is loaded (#71), and the computation of the control amount is carried out through PID control, taking a difference between the target angle and the actual angle as an input (#72). Furthermore, the driving signal is generated from the control amount and is sent to the hydraulic control valve 72 (#73). Note that in the case of No in step #31, step #33, and so on, the process immediately moves to the substantial feedback control in step #71 to #73. Finally, it is checked whether or not an abnormality (a malfunction or the like) has occurred in the VVT mechanism 1, and the standby time is compared to a threshold serving as a condition for determining the occurrence of an abnormality (#74). In the case where the standby time has exceeded the threshold (Yes in #74), it is determined that an abnormality has occurred, and an abnormality occurrence signal is outputted (#74). In the case where the standby time is less than the threshold (No in #74), the process returns to step #33, and the rotational phase control routine is continued.

The desired rotational phase displacement is realized by repeating the stated rotational phase control routine, and this process (from startup to lock release) will be described using the schematic diagram in FIG. 20.

Although not shown, the starting point of this process corresponds to a driving stopped state, where the restriction pin 5 and the locking pin 6 are inserted into the restriction recess 52 and the locking recess 62, respectively.

Step (1)

Although not shown, at startup, oil pressure is first applied to the advance chamber 41, after which the working oil is supplied to the retard chamber 42 for retard control. At this time, the working oil supplied to the retard chamber 42 advances into the locking recess 62 and pushes the locking pin 6 upward.

Step (2)

When the locking pin 6 is lifted from the locking recess 62, the rotational phase displaces in the retard direction under the oil pressure on the retard chamber 42.

Step (3)

When the rotational phase displaces to a predetermined phase, the supply of the working oil to the retard chamber 42 is stopped, and the working oil is then supplied to the advance chamber 41 for advance control. The working oil supplied to the advance chamber 41 is used to lift the restriction pin 5 from the restriction recess 52 and to hold the locking pin 6 up (that is, release the lock).

Step (4)

When the restriction pin 5 is lifted from the restriction recess 52, the rotational phase displaces in the advance direction under the oil pressure on the advance chamber 41.

Step (5)

Furthermore, because the locking pin 6 is held up (that is, the lock is released), the displacement of the rotational phase in the advance direction passes beyond the locked position. As a result, the displacement continues to an advance position suited for acceleration.

Other Embodiments (1) Although the aforementioned embodiments illustrate the configuration as blocks having individual functions in order to facilitate understanding of the control unit 7, the functional blocks are for illustrative purposes, and the present invention is not limited to functional blocks divided in this manner. For example, the structure may combine any of the property obtainment unit 92, the lock release command unit 93, the target calculation unit 94, the standby time changing unit 95, the lock release failure determination unit 97, and the abnormality determination unit 98. Furthermore, the control unit 7 itself may be constructed within the engine ECU 11. Conversely, the functions of the control unit 7 may be constructed in a second control unit.

(2) The various functions, maps, and so on introduced into the control unit 7 use phrases employed for the sake of simplicity, and include a variety of forms, such as processors, tables, neural networks, databases, and so on that perform output based on input parameters.

(3) The displacement change rate: λ found by the differentiator 921 of the property obtainment unit 92 may be found from the rotational phase displacement in the retard direction or may be found from the rotational phase displacement in the advance direction.

(4) The configuration of the standby time changing unit 96 in the above embodiment is merely one embodiment, and any desired configuration may be employed as long as it is a configuration having a function for changing the standby time based on the property information. Constructing a map that derives the standby time from a plurality of input parameters is a particularly favorable embodiment.

(5) The phrase "oil pressure" used herein refers to a fluid pressure, and the "working oil" referred to here can be replaced with a variety of fluids that transmit pressure while remaining within the scope of the present invention.

(6) In the aforementioned embodiment, the configuration provides a standby time that causes the phase to stand by in the retard position beyond the intermediate locked phase and the standby time is changed based on the hydraulic properties; however, the configuration may be such that the control is switched to the advance control after the retard control has been carried out for a predetermined amount of time and the predetermined amount of time is changed based on the hydraulic properties in order to release the locked state. Through this, the predetermined amount of time for carrying out the retard control until the restriction member 6 is positioned within the restriction liftable range Lt is set based on the hydraulic properties. In other words, the relative phase between the outer rotor 2 and the inner rotor 3 is not held at a set position here; rather, the retard control is carried out for the predetermined amount of time, and the inner rotor 3 continues to be moved to the retard-side. Once the rear plate channel 84 and the first through-channel 85a communicate and a retard phase is furthermore achieved, the control is then switched to the advance control. Although the inner rotor 3 once again inverts to the advance-side, the rear plate channel 84 and the first through-channel 85 communicate for a set amount of time, and thus the restriction pin 5 is released during that period. According to this configuration, the retard operation and the advance operation only need be carried out once each, making the control easier to perform. Accordingly, the restriction-lifted state and the lock-released state can be held, and the release of the locking by the locking mechanism unit 60 can be realized, with certainty.

(7) Although the aforementioned embodiment describes a configuration in which the restriction mechanism 50 is disposed further on the retard-side than the locking mechanism unit 60, the restriction mechanism 50 may be disposed on the advance-side based on the properties of the engine E. In this case, an operation for removing the locking pin 6 is performed in the advance operation, and an operation for removing the restriction pin 5 is performed in the retard operation.

(8) Although the aforementioned embodiment describes a configuration in which the partition portion 31 is disposed in the inner rotor 3 (the driven-side rotating member), the partition portion 31 may be disposed in the outer rotor 2 (the driving-side rotating member). In this case, the restriction member 5 and the lock member 6 are disposed in the outer rotor 2, and the restriction recess 52 and the locking recess 62 are disposed in the inner rotor 3.

INDUSTRIAL APPLICABILITY

The present invention can be used in a valve timing adjusting system including a displacement mechanism unit that displaces the rotational phase of a camshaft relative to a crankshaft of an internal combustion engine, a locking mechanism unit that locks the rotational phase at an intermediate locked phase positioned within a displacement range of the rotational phase, a hydraulic pathway having a hydraulic control valve that hydraulically drives the displacement mechanism unit and the locking mechanism unit, and a control unit having a control system that controls operations of the hydraulic control valve.

REFERENCE SIGNS LIST

1: VVT mechanism
31: partition portion (displacement mechanism unit)
32: vane (displacement mechanism unit)
41: advance chamber
42: retard chamber
5: restriction member (restriction pin)
52: restriction recess
60: locking mechanism unit
6: lock member (locking pin)
62: locking recess
7: hydraulic pathway
71: hydraulic pump
72: hydraulic control valve
9: control unit
92: property obtainment unit
921: differentiator
922: oil pressure estimation unit
94: target calculation unit
95: standby time changing unit
951: correction time calculation unit
952: learning-based correction unit (correction unit)
96: feedback control unit
961: deviation calculation unit
962: PID controller
963: drive control unit
97: lock release failure determination unit
98: abnormality determination unit

The invention claimed is:

1. A valve timing adjusting system comprising:
a displacement mechanism unit that displaces a rotational phase of a camshaft relative to a crankshaft of an internal combustion engine between a retard position and an advance position, a locking mechanism unit that locks the rotational phase at an intermediate locked phase positioned within a displacement range of the rotational phase by inserting a locking pin into a locking recess, a hydraulic pathway having a hydraulic control valve that hydraulically drives the displacement mechanism unit and the locking mechanism unit, and a control unit having a control system that controls operations of the hydraulic control valve,
wherein the control unit includes a property obtainment unit that obtains property information regarding hydraulic properties of the hydraulic pathway, the property information including a rotational displacement change rate computed based on a change in an actual rotational phase of the camshaft relative to the crankshaft;
a lock release process that releases the locking of the locking mechanism unit to complete the locking release by supplying oil pressure to the locking mechanism unit for moving the rotational phase from the intermediate locked phase toward one of the retard position and the advance position, and then supplying oil pressure to the locking mechanism unit for moving the rotational phase toward the other of the retard position and the advance position;
the rotational phase is caused to stand by at a predetermined position of the one of the retard position and the advance position past the intermediate locked phase during the lock release process, until a standby time has elapsed; and
the system further comprises a standby time changing unit that changes the standby time based on the property information.

2. The valve timing adjusting system according to claim 1, wherein the property information includes at least one of an oil temperature, an oil pressure, an RPM of a hydraulic pump, and a degree of oil degradation in the hydraulic pathway.

3. The valve timing adjusting system according to claim 1, wherein the standby time changing unit includes a correction unit that extends and corrects the standby time in the case where a lock release failure has been detected in the locking mechanism unit.

4. The valve timing adjusting system according to claim 3, wherein the correction unit is a learning-based correction unit that calculates a correction amount for the standby time based on a learning result from a plurality of lock release failures.

5. The valve timing adjusting system according to claim 1, further comprising:
an abnormality determination unit that outputs an abnormal signal when the standby time extended by the standby time changing unit exceeds a threshold.

* * * * *